(12) United States Patent
Mizuno et al.

(10) Patent No.: US 7,652,363 B2
(45) Date of Patent: Jan. 26, 2010

(54) SEMICONDUCTOR DEVICE INCLUDING AN ARRANGEMENT FOR DETECTION OF TAMPERING

(75) Inventors: Hirotaka Mizuno, Kodaira (JP); Yoshio Masumura, Tachikawa (JP); Takeo Kon, Kodaira (JP); Yukio Kawashima, Chitose (JP)

(73) Assignee: Renesas Technology Corp., Tokyo (JP)

(*) Notice: Subject to any disclaimer, the term of this patent is extended or adjusted under 35 U.S.C. 154(b) by 157 days.

(21) Appl. No.: 11/439,269

(22) Filed: May 24, 2006

(65) Prior Publication Data

US 2006/0214280 A1   Sep. 28, 2006

Related U.S. Application Data

(63) Continuation of application No. 10/486,083, filed on Feb. 6, 2004, now abandoned.

(30) Foreign Application Priority Data

Aug. 7, 2001 (JP) .............................. 2001-239009
Dec. 13, 2002 (WO) ....................... PCT/JP02/06577

(51) Int. Cl.
*H01L 23/52* (2006.01)
*H01L 23/02* (2006.01)
*H01L 23/58* (2006.01)
*G06F 21/00* (2006.01)
*G06K 19/073* (2006.01)
*G06F 12/14* (2006.01)
*H01L 21/3205* (2006.01)

(52) U.S. Cl. .............................. 257/692; 257/E23.019; 257/E23.064; 257/E23.143; 257/E21.511; 257/758; 257/679; 257/368; 257/379; 257/374; 257/774; 257/773; 257/922; 257/288; 257/314

(58) Field of Classification Search .................. 257/692, 257/758, E23.019, 679, E23.064, E23.143, 257/368, E21.511, 379, 374, 774, 773, 922, 257/288, 314; 438/622
See application file for complete search history.

(56) References Cited

U.S. PATENT DOCUMENTS 3,702,464 A    11/1972   Castrucci (Continued)

FOREIGN PATENT DOCUMENTS

JP           62-501242         5/1987

(Continued)

OTHER PUBLICATIONS

International Search Report.

*Primary Examiner*—Alexander O Williams
(74) *Attorney, Agent, or Firm*—Antonelli, Terry, Stout & Kraus, LLP.

(57) ABSTRACT

Wiring lines for the supply of a voltage to feed a drive voltage to an integrated circuit formed in a semiconductor chip are disposed so as to cover a main surface of the semiconductor chip, so that, if the wiring lines are removed for the purpose of analyzing information stored in the semiconductor chip, the integrated circuit does not operate and it is impossible to analyze the information. Further, there is provided a processing detector circuit for detecting that the wiring lines have been tampered with. When the processing detector circuit detects a change in the state of the wiring lines, the integrated circuit is reset. Thus, it is possible to improve the security of information stored on the card.

25 Claims, 28 Drawing Sheets

U.S. PATENT DOCUMENTS

| | | | |
|---|---|---|---|
| 5,612,532 A * | 3/1997 | Iwasaki | 235/492 |
| 5,767,544 A * | 6/1998 | Kuroda et al. | 257/318 |
| 6,438,036 B2 * | 8/2002 | Seki et al. | 365/185.22 |
| 6,467,016 B1 | 10/2002 | Kanai | |
| 6,467,690 B1 | 10/2002 | Reeves | |
| 6,531,735 B1 | 3/2003 | Kamigaki et al. | |
| 6,566,872 B1 * | 5/2003 | Sugitani | 324/249 |
| 6,952,027 B2 | 10/2005 | Takizawa | |
| 2004/0177215 A1 | 9/2004 | Nagamasa et al. | |
| 2005/0198424 A1 | 9/2005 | Harari et al. | |
| 2008/0037323 A1 * | 2/2008 | Shukuri et al. | 365/185.04 |

FOREIGN PATENT DOCUMENTS

| | | |
|---|---|---|
| JP | 3-8360 | 1/1991 |
| JP | 3-218633 | 9/1991 |
| JP | 9-17956 | 1/1997 |
| JP | 11-145401 | 5/1999 |
| JP | 2000-76140 | 3/2000 |
| JP | 2002-529928 | 9/2002 |

* cited by examiner

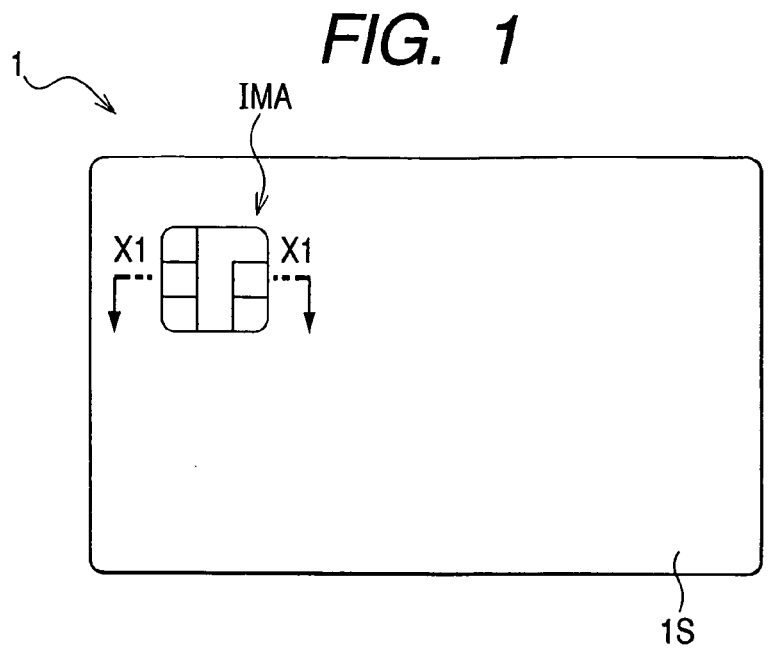
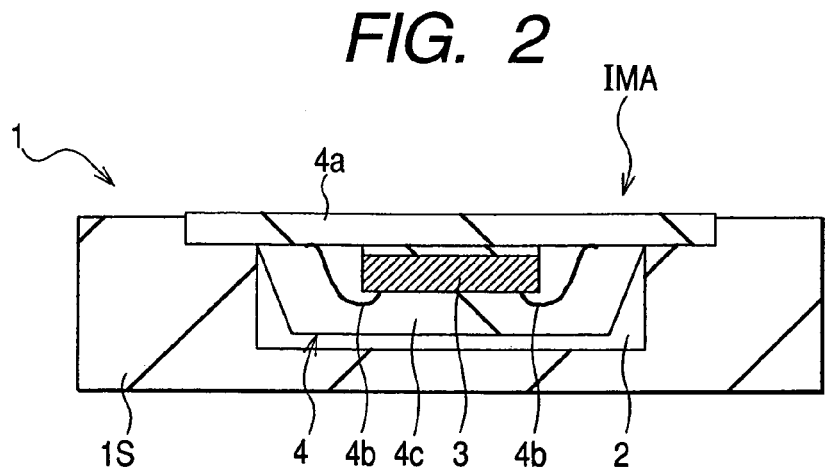
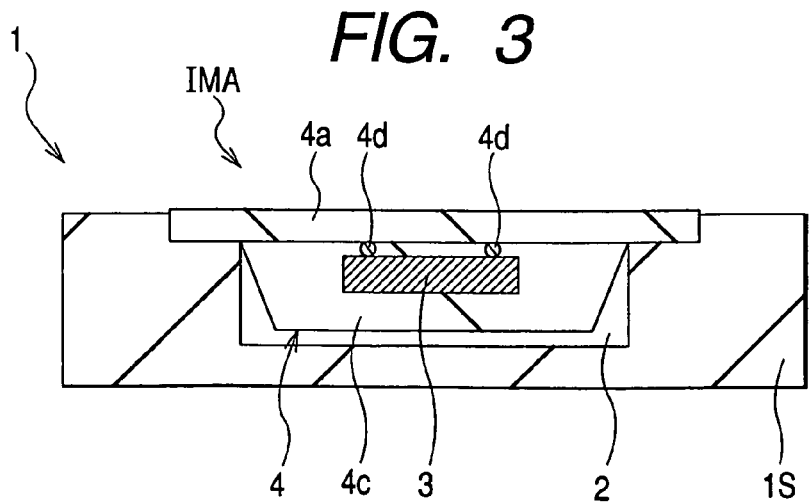

|  |  | N1 | N2 | N3 | N4 | OUT |
|---|---|---|---|---|---|---|
| M1 | NORMAL | L | H | L | H | L |
| M2 | VCC NOT SUPPLIED | — | L | H | L | H |
| M3 | GND NOT SUPPLIED | H | — | — | L | H |

SEMICONDUCTOR DEVICE INCLUDING AN ARRANGEMENT FOR DETECTION OF TAMPERING

CROSS-REFERENCE TO RELATED APPLICATION

This application is a continuation application of application Ser. No. 10/486,083, filed Feb. 6, 2004 (now abandoned), the disclosure of which is hereby incorporated by reference. It is also noted that the present application is related to Ser. No. 11/590,881, filed on Nov. 1, 2006, which is a continuation application of the same parent application Ser. No. 10/486,083 (now abandoned).

TECHNICAL FIELD

The present invention relates to a semiconductor device and an IC (Integrated Circuit) card technique. Particularly, the present invention is concerned with a technique which is applicable to the improvement of security for information stored in a semiconductor device.

BACKGROUND OF THE INVENTION

In an IC card which the present inventors have studied, the reading and writing of data from and to memory are managed by the function of a CPU (Central Processing Unit) incorporated in the IC card, and a high security function is ensured in which a cipher processing is executed by the card itself. Further, its memory capacity is 30 to 100 times larger than that of a magnetic card. Thus, the IC card in question is expected to see considerable use as an information storage medium in various fields, including finance, distribution, medical care, traffic, transportation, and education. In a general IC card structure, a recess is formed in part of a plastic sheet, which is about the size of a name or business card, and a packaged semiconductor chip is embedded therein. As a top layer of the semiconductor chip, there is a surface protecting film formed of an insulating material so as to cover the whole of the main surface of the semiconductor chip. Wiring lines, such as bus lines and control lines arranged on the main surface of the semiconductor chip are covered with an overlying multi-layer interconnection.

A technique for improving the information security of a semiconductor device is described, for example, in Japanese Unexamined Patent Publication No. Hei 11 (1999)-145401, which technique involves the provision of a conductor layer serving as a shield layer that overlies and covers the semiconductor element so as to prevent access to the wiring lines thereof. However, the present inventors have found that the following problems are inherent in the IC card security technique described in this publication.

One problem with the above-described security technique is that, if the semiconductor device is operated after removing the whole of the shield layer with a chemical and if, in this state, a needle for analysis is brought into direct contact with a bus line or a signal line, it is possible to analyze information stored in the semiconductor device. In addition, although bus lines and signal lines are covered with the multi-layer interconnection, an uncovered gap will typically occur in an input port of a module or the like in relation to the layout of the power supply wiring. There may occur a case where information stored in the semiconductor device can be analyzed by the application of an analyzing needle through such a gap.

It is an object of the present invention to provide a technique for improving the security of information stored in a semiconductor device.

The above and other objects and novel features of the present invention will become apparent from the following description and the accompanying drawings.

SUMMARY OF THE INVENTION

Typical features of the invention as disclosed herein will be outlined below.

According to the present invention, if a predetermined wiring line which overlies a semiconductor chip is removed or cut, it becomes impossible to analyze information stored in the semiconductor chip.

According to the present invention, a processing detector circuit is provided for detecting the processing of a predetermined wiring line which overlies a semiconductor chip.

BRIEF DESCRIPTION OF THE DRAWINGS

FIG. 1 is a plan view of an IC card (a semiconductor device) according to a first embodiment of the present invention;

FIG. 2 is a sectional view taken on line X1-X1 in FIG. 1;

FIG. 3 is a sectional view taken on line X1-X1 in FIG. 1 in an IC card according to a modification of the structure of FIG. 2;

BEST MODE FOR CARRYING OUT THE INVENTION

Figure 4:
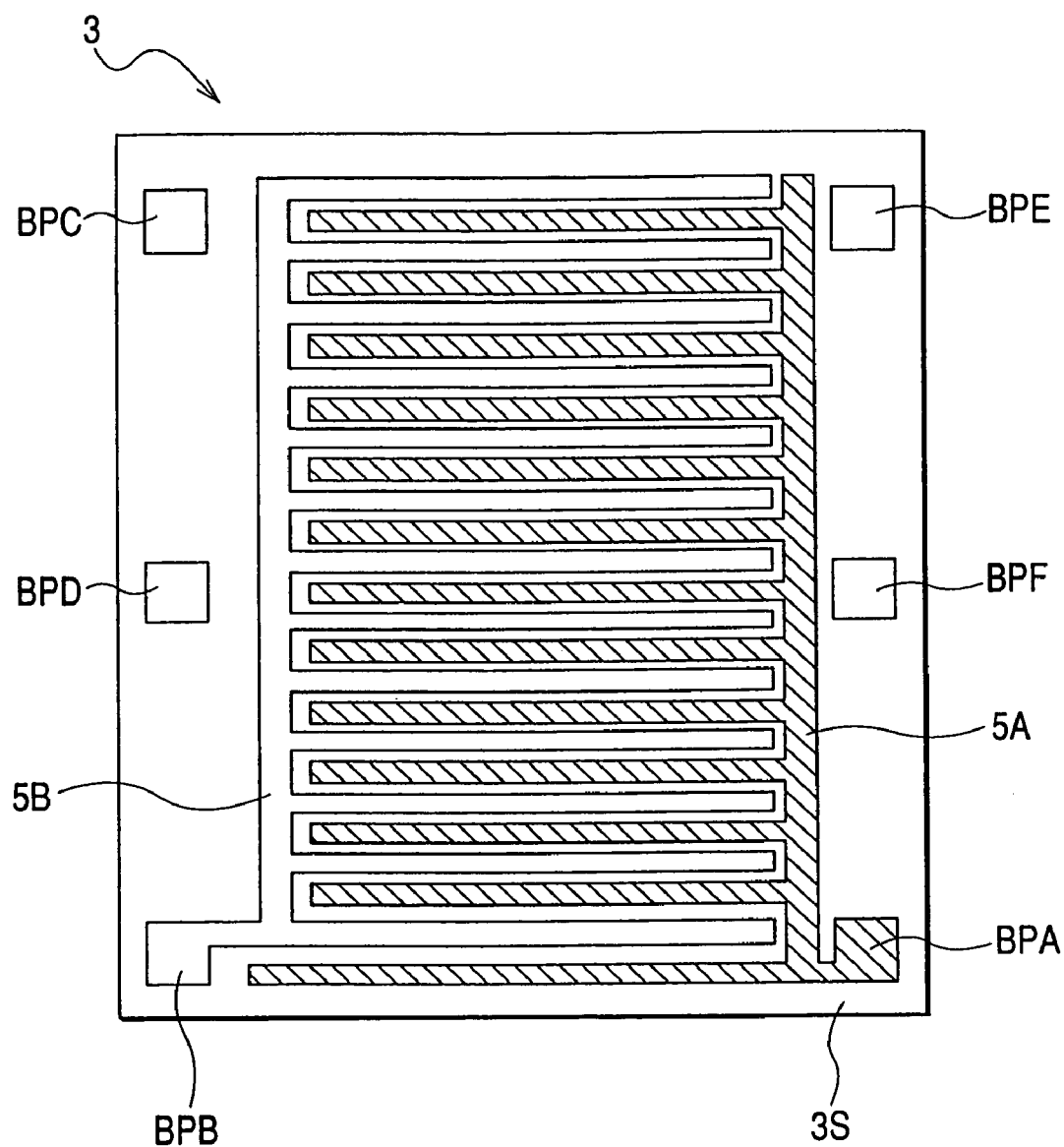
FIG. 4 is a plan view of a semiconductor chip which constitutes the IC card of FIG. 1.

In the following specification, various embodiments will be described, in which the subject matter of the invention may be dividedly into plural sections or embodiments where required for the sake of convenience; however, unless otherwise mentioned, it is to be understood that they are not unrelated to each other, but one is in the relation of a modification or detailed or supplementary explanation of part or the whole of the other.

When reference is made, for example, to the number of elements (including the number of pieces, numerical value, quantity, and range) in the following description of the embodiments, no limitation is made to the specified number, but numbers above and below the specified number will do unless otherwise specified, except for the case where a limitation is clearly directed to the specified number.

In the following description of the embodiments, moreover, it goes without saying that their components (including constituent steps) are not always essential unless otherwise mentioned, except for the case where they are clearly considered essential.

Likewise, in the following description of the embodiments, it is to be understood that when reference is made to the shape or positional relation of a component, those characteristics substantially similar or closely similar thereto are also included unless otherwise mentioned, except for the case where the answer is clearly negative. This is also true of the foregoing numerical value and range.

In all of the drawings, portions having the same functions are identified by like reference numerals, and repeated explanations thereof will be omitted.

In the drawings, even plan views may be hatched to make them easier to understand.

Further, in the following description of the embodiments, a MIS•FET (Metal Insulator Semiconductor Field Effect Transistor) which typifies field effect transistors is abbreviated MIS, a p-channel type MIS•FET is abbreviated pMIS, and an n-channel MIS•FET is abbreviated nMIS.

Various embodiments of the present invention will be described in detail hereinunder with reference to the accompanying drawings.

FIRST EMBODIMENT

FIG. 1 is a plan view of the whole of an IC card (a semiconductor device) according to a first embodiment of the present invention, and FIG. 2 is a sectional view taken on line X1-X1 in FIG. 1.

The IC card 1 is of the type used as an information storage medium in various fields, including finance, distribution, medical care, traffic, transportation, or education, such as electronic money, credit card, portable telephone, chargeable satellite broadcast receiver, identification card, license, insurance policy, electronic medical sheet, and electronic railroad ticket. The card body 1S of the IC card 1 is constituted by a plastic sheet which is rectangular as seen in plan view, for example. The length and width of the card body 1S are, for example, 85.47 to 85.72×53.92 to 54.03 cm, and the thickness thereof is, for example, 0.68 to 1.84 mm.

In part of a main surface of the card body 1S there is provided an information storage area IMA which is generally quadrangular as seen in plan view. A groove 2 is formed in the information storage area IMA of the card body 1S, and a package 4 which incorporates a semiconductor chip (hereinafter referred to simply as "chip") 3 is mounted therein in an embedded manner. The length and width of the information storage area IMA are, for example, 11.4×12.6 cm.

The chip 3 is mounted on a package substrate 4a in such a manner that the main surface (a device-forming surface) thereof faces the bottom of the groove 2, and the back side thereof is bonded to the package substrate 4a.

Figure 18:
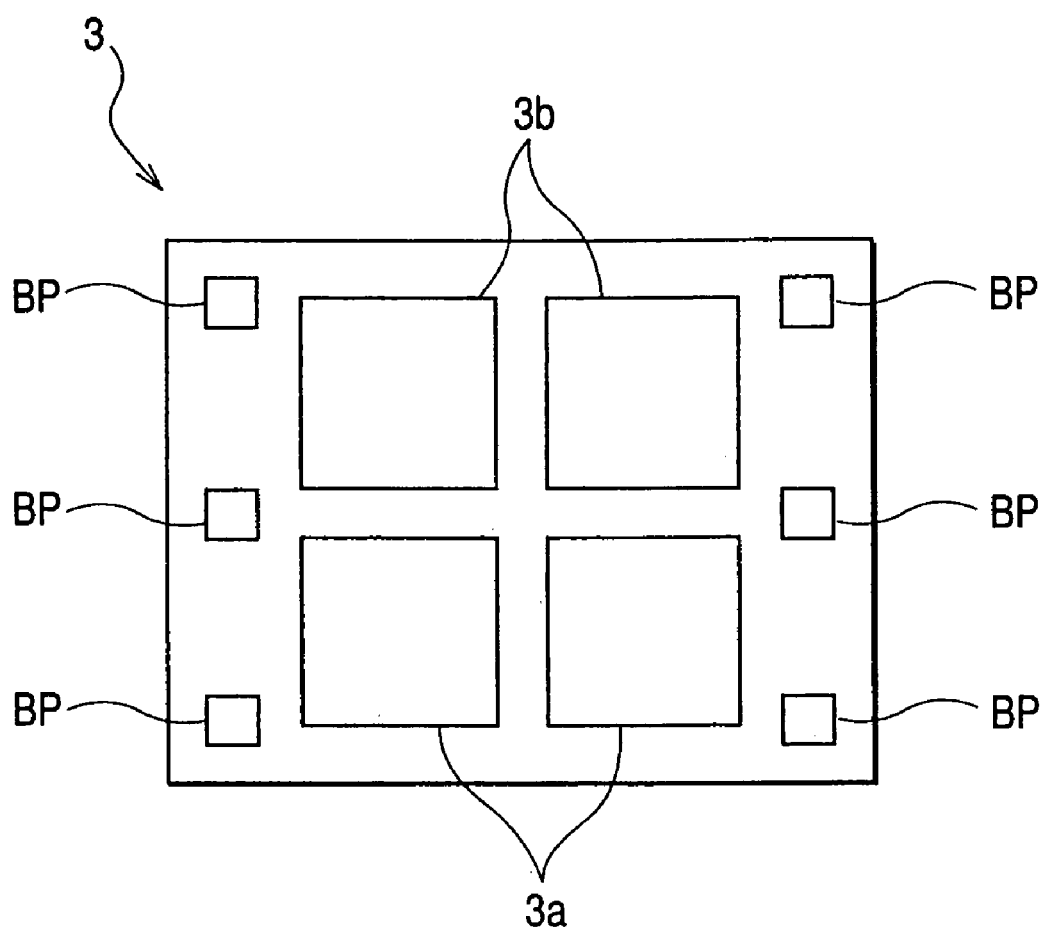
FIG. 18 is a plan view of the main surface of the semiconductor chip shown in FIG. 4.

On the main surface of the chip 3 there is an integrated circuit constituted by a logic circuit group 3b, including, for example, memory circuits 3a (see FIG. 18, for example), and a CPU (Central Processing Unit) for controlling the operation of the memory circuits. The memory circuits 3a are constituted, for example, by a group of such memory elements (first elements) as non-volatile memory elements and/or RAM (Random Access Memory), e.g., EEPROM (Electric Erasable Programmable Read Only Memory), flash memory, and mask ROM.

Electrodes of the integrated circuit formed on the chip 3 are drawn out by external terminals BP, such as bonding pads.

The bonding pads are electrically connected through bonding wires 4b to lands formed on a main surface of the package substrate 4a. The chip 3 and the bonding wires 4b are sealed with sealing resin 4c, e.g., epoxy resin. The back side of the package substrate 4a, i.e., the side opposite to the mounting surface of the chip 3, faces a surface of the IC card 1. On the back side of the package substrate 4a, plural electrodes are formed which are electrically connected to electrodes formed on the main surface of the package substrate 4a. Through these electrodes, it is possible to supply data to the chip 3 from the exterior and receive data from the chip.

The method used for mounting the chip 3 is not limited to the one illustrated in FIG. 2. For example, a face-down bonding method may be adopted, as shown in FIG. 3. According to this method, bump electrodes 4d are formed on the external terminals BP, and with the main surface (device-forming surface) of the chip 3 arranged to face the package substrate 4a, the chip 3 is mounted onto the package substrate 4a through the bump electrodes 4d that have been formed on the main surface of the chip 3. The integrated circuit of the chip 3 is electrically connected through the external terminals BP and bump electrodes 4d to wiring formed on the package substrate 4a.

FIG. 4 is a plan view of a top wiring layer formed on the main surface side of the chip 3 that is shown in FIG. 2 or FIG. 3. A semiconductor substrate (simply "substrate" hereinafter) 3S, which constitutes the chip 3, is constituted by a small piece of a single crystal of p-type silicon (Si) which is square as seen in plan view, for example. In this first embodiment, as shown in FIG. 4, bonding pads BPA to BPF are arranged near an outer periphery of the chip 3, of which BPA and BPB are patterned integrally with wiring lines 5A and 5B for the supply voltage and are connected electrically thereto. The bonding pad BPC is a terminal for input of a clock signal for example. The bonding pad BPD is a terminal, used for input of a predetermined control signal, for example. Further, the bonding pads BPE and BPF are terminals for transmission and reception of input and output signals.

The wiring lines 5A and 5B for the supply voltage are arranged so as to cover the main surface of the chip 3. That is, the wiring lines 5A and 5B are arranged so as to cover the integrated circuit (memory circuits 3a and logic circuit group 3b). The wiring line 5A is used for the supply of a supply voltage (GND, e.g., 0V) on a low potential side to the integrated circuit formed on the chip 3. The wiring line 5B is used for the supply of a supply voltage (VCC, e.g., 1.8V, 3.0V, 5.0V) on a high potential side to the integrated circuit formed on the chip 3. The wiring lines 5A and 5B are formed in the shape of comb teeth as seen in plan view and the respective teeth are arranged so as to mesh with each other in the same wiring layer. Both wiring lines 5A and 5B thdisposed adjacent to each other are arranged so that the spacing between them is as narrow as possible. That is, the elements on the main surface of the chip 3 are covered closely without any gap by both wiring lines 5A and 5B. Consequently, even if an attempt is made to apply a needle to a signal line which underlies the wiring lines 5A and 5B for the purpose of analyzing information stored in the chip 3, it cannot be done because access is obstructed by both wiring lines 5A and 5B. Observing from the exterior the signal lines and elements that underlie the wiring lines 5A and 5B is very difficult because all elements are obstructed by both wiring lines 5A and 5B. That is, the wiring lines 5A and 5B function as a shield for protecting information. Therefore, in the structure of this first embodiment, for analyzing information stored in the chip 3, it is necessary to remove the wiring lines 5A and 5B which carry the supply voltage. However, since both wiring lines 5A and 5B operate to supply an operating voltage to the integrated circuit formed on the chip 3, if they are removed, the supply voltage is no longer fed to the integrated circuit, with the result that the integrated circuit does not operate, and it is impossible to analyze the information stored in the chip 3. Thus, it is possible to improve the security of information carried in the IC card 1.

Figure 5:
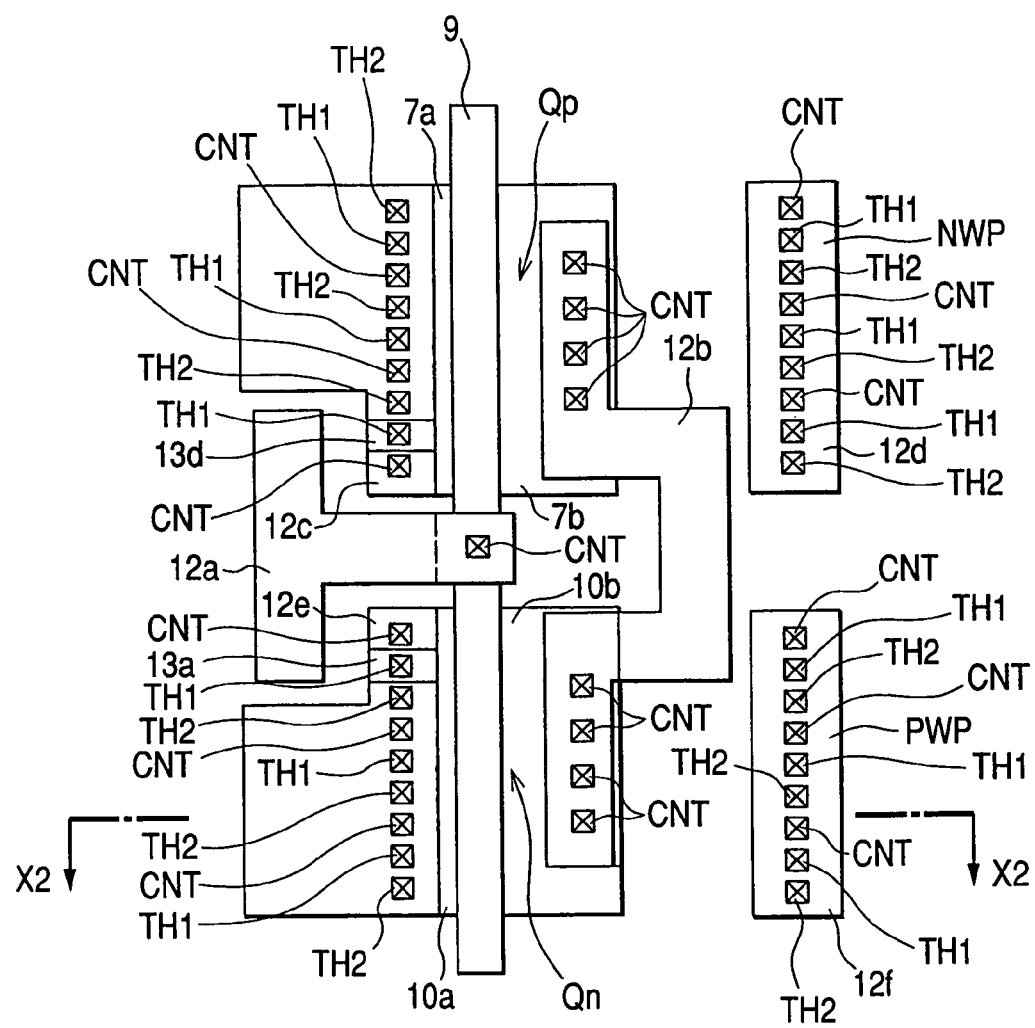
FIG. 5 is a plan view of a principal portion of an element area on a main surface of the semiconductor chip.
Figure 6:
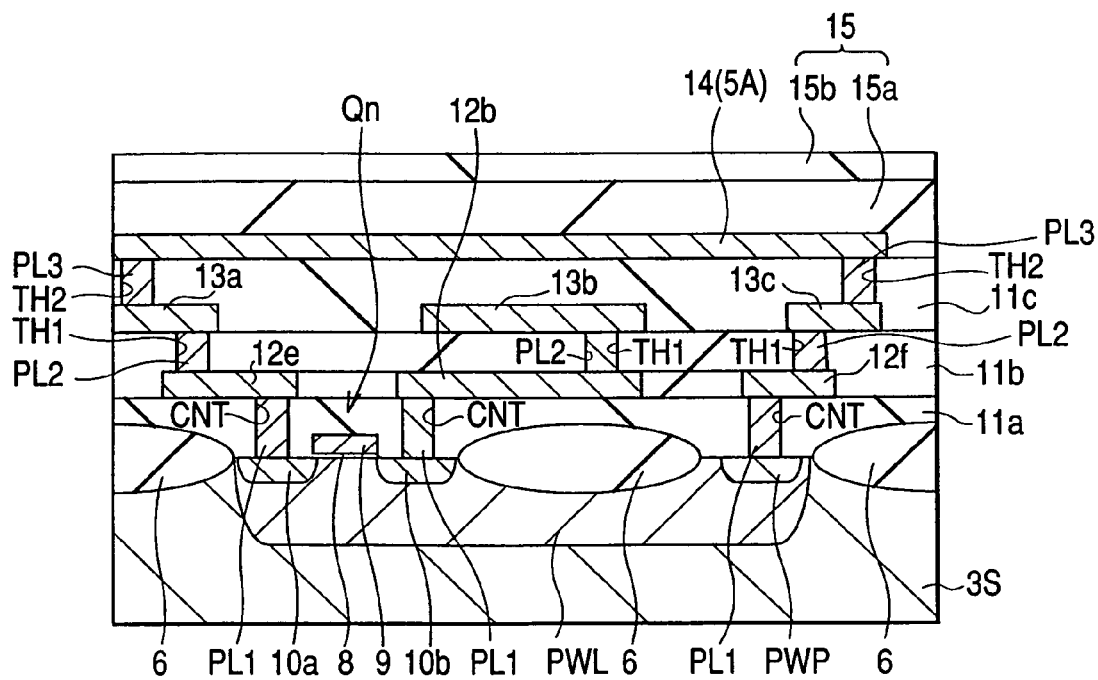
FIG. 6 is a sectional view of a principal portion of the semiconductor chip.

FIG. 5 is a plan view of a principal portion of an element area formed on the main surface of the chip 3 shown in FIG. 4, and FIG. 6 is a sectional view taken on line X2-X2 in FIG. 5. On a main surface side of the substrate 3S, a field insulating film 6 is formed in an isolation region. The field insulating film 6 is formed of a silicon oxide (e.g., $SiO_2$) by a selective oxidation (LOCOS: Local Oxidation of Silicon) method, for example. The field insulating film 6 may be replaced by a grooved isolation region (SGI: Shallow Groove Isolation). The grooved isolation region is formed by embedding an insulating film, such as a silicon oxide film, into a groove formed in the main surface of the substrate 3S. An active region is formed in the area surrounded with the field insulating film 6 and the grooved isolation region.

Further, n-well and p-well PWL are formed to a predetermined depth from the main surface of the substrate 3S. For example, phosphorus (P) or arsenic (As) is contained in the n-well, while boron (B) or boron difluoride ($BF_2$) is contained in the p-well. Within the area of the n-well and in the active region surrounded with the field insulating film 6 there are disposed a pMIS (second element) Qp and a well power supply region NWP, which are isolated from each other through the field insulating film 6.

The pMIS Qp comprises a p-type semiconductor region 7a for the source, a p-type semiconductor region 7b for the drain, a gate insulating film 8, and a gate electrode 9. For example, boron (B) is contained in the p-type semiconductor regions 7a and 7b. The gate insulating film 8 is formed of a silicon oxide, for example, provided the material of the gate insulating film 8 is not limited thereto, but any of various other materials may be used. For example, the gate insulating film 8 may be a silicon oxynitride film (SiON). That is, a structure may be adopted wherein nitrogen is segregated in an interface between the gate insulating film 8 and the substrate 3S. The silicon oxynitride film is more effective than the silicon oxide film in suppressing the generation of an interface state in the film or in diminishing an electron trap, so that it is possible to improve the hot carrier resistance of the gate insulating film 8 and improve the dielectric strength. Besides, it is more difficult for impurities to penetrate through the silicon oxynitride film than through the silicon oxide film, so that, by using the silicon oxynitride film, it is possible to suppress a variation of the threshold voltage caused by diffusion of an impurity contained in the gate electrode material toward the substrate 3S. The silicon oxynitride film can be formed, for example, by heat-treating the substrate 3S in a nitrogen gas-containing atmosphere, such as NO, $NO_2$, or $NH_3$. Also by heat-treating the substrate 3S in the nitrogen gas-containing atmosphere after formation of the gate insulating film 8 of a silicon oxide on the surface of the substrate 3S and by subsequently segregating nitrogen in the interface between the gate insulating film 8 and the substrate 3S, the same effect can be obtained as indicated above. The gate electrode 9 is formed of a low resistance polycrystalline silicon, for example, although no limitation is made thereto, but any of various other materials may be used. For example, a so-called polycide gate electrode structure may be adopted wherein a silicide layer, such as cobalt silicide ($CoSi_x$) layer, is formed on a low resistance polycrystalline silicon film, or a so-called polymetal gate electrode structure wherein a metal film such as tungsten film is formed on a low resistance polycrystalline silicon film, through a barrier metal layer, such as a tungsten nitride (WN) layer. The well power supply region NWP is used for applying a back bias voltage to the n-well and is formed by the presence of, for example, phosphorus or arsenic on top of the n-well at a higher concentration than in the n-well itself.

Within the area of the p-well PWL, and in the active region surrounded with the field insulating film 6, there are an nMIS (second element) Qn and a well power supply region PWP, which are isolated from each other through the field insulating film 6.

The nMIS Qn comprises an n-type semiconductor region 10a for the source, an n-type semiconductor region 10b for the drain, a gate insulating film 8, and a gate electrode 9. For example, phosphorus or arsenic is contained in the n-type semiconductor regions 10a and 10b. As to the structure of the gate insulating film 8 and gate electrode 9 in the nMIS Qn, an explanation thereof will be omitted because it is the same as that described above in connection with the pMIS Qp. The gate electrode 9 of the pMIS Qp and that of the nMIS Qn are integrally patterned and are connected electrically with each other. The gate electrode 9 serves as an input of a CMIS inverter circuit which is constituted by both a pMIS Qp and a nMIS Qn. The well power supply region PWO is used for applying a back bias voltage to the p-well PWl and is formed by the presence of, for example, boron or boron difluoride on top of the p-well PWL at a higher concentration than in the p-well PWL itself.

The integrated circuit (memory circuits 3a and logic circuit group 3b) is constituted by the pMIS Qp and/or the nMIS Qn. An interlayer insulating film constituted by a silicon oxide film, for example, is deposited on the main surface of the substrate 3S. First-layer wirings 12a to 12f each constituted by a metallic film, such as an aluminum (Al) or aluminum alloy film, are formed on the interlayer insulating film 11a. The first-layer wiring 12a is electrically connected to the gate electrode 9 through a plug disposed within a contact hole CNT. The first-layer wiring 12b is electrically connected to both p-type semiconductor region 7b and n-type semiconductor region 10b for the drain of the pMIS Qp and the nMIS Qn, each through a plug PL1 that is disposed within a contact hole CNT. That is, the first-layer wiring 12b serves as an output of a CMIS inverter circuit. The first-layer wiring 12c is electrically connected to the p-type semiconductor region 7a of the pMIS Qp through a plug that is disposed within a contact hole CNT. The first-layer wiring 12d is electrically connected to the well power supply region NWP through a plug that is disposed within a contact hole CNT. The first-layer wiring 12e is electrically connected to the n-type semiconductor region 10a of the nMIS Qn through a plug PL1 that is disposed within a contact hole CNT. The first-layer wiring 12f is electrically connected to the well power supply region PWP through a plug PL1 that is disposed within a contact hole CNT. The plug PL1 is constituted, for example, by a metallic film, such as aluminum, aluminum alloy, or a tungsten film.

An interlayer insulating film 11b constituted by a silicon oxide film, for example, is deposited on the interlayer insulating film 11a to cover the first-layer wirings 12a to 12f. Second-layer wirings 13a to 13d, each constituted by a metallic film, such as, for example, aluminum or aluminum alloy film, are formed on the interlayer insulating film 11b. The second-layer wiring 13a is electrically connected to the first-layer wiring 12e through a plug PL2 that is disposed within a through hole TH1 formed in the interlayer insulating film 11b. The second-layer wiring 13b is electrically connected to the first-layer wiring line 12b through a plug PL2 that is disposed within a through hole TH1 formed in the interlayer insulating film 11b. The second-layer wiring 13c is electrically connected to the first-layer wiring 12f through a plug PL2 that is disposed within a through hole TH1 formed in the interlayer insulating film 11b.

Further, an interlayer insulating film 11c, constituted by a silicon oxide film, for example, is formed on the interlayer insulating film 11b to cover the second-layer wirings 13a to 13d. A third-layer wiring 14 constituted by a metallic film, such as, for example, an aluminum or aluminum alloy film, is formed on the interlayer insulating film 11c. The wiring lines 5A and 5B for the supply voltage are formed by the third-layer wiring 14. In FIG. 6, there is illustrated the wiring line 5B for the supply voltage on a low potential side. The third-layer wiring 14 is electrically connected to the second-layer wirings 13a and 13c, each through a plug PL3 that is disposed within a through hole TH2. That is, the wiring line 5A for the supply voltage on a low potential side is electrically connected to the n-type semiconductor region 10a for the source of the nMIS Qn and also to the power supply region PWP. The wiring line 5B for the supply voltage on a high potential side is electrically connected to the p-type semiconductor region 7a for the source of the pMIS Qp and also to the power supply region NWP. Further, a surface protecting film 15 is deposited on the interlayer insulating film 11c. The surface protecting film 15 is formed by depositing an insulating film 15b made of a polyimide resin, for example, onto an insulating film 15a made of a silicon nitride film which is formed by a plasma CVD (Chemical Vapor Deposition) method, for example. The wiring lines 5A and 5B may each be constituted so as to feed a supply voltage to the MIS•FET well region located near a lower portion thereof. In this case, if portions of the wiring lines 5A and 5B are cut or removed, the supply voltage is not fed to the integrated circuits 3a and 3b located near lower positions of the removed portions, or of the portions of the wiring lines 5A and 5B which have become disconnected electrically from the bonding pads BPA and BPB, so that the integrated circuits fail to operate, and it becomes impossible to analyze information stored in the chip 3.

SECOND EMBODIMENT

Figure 7:
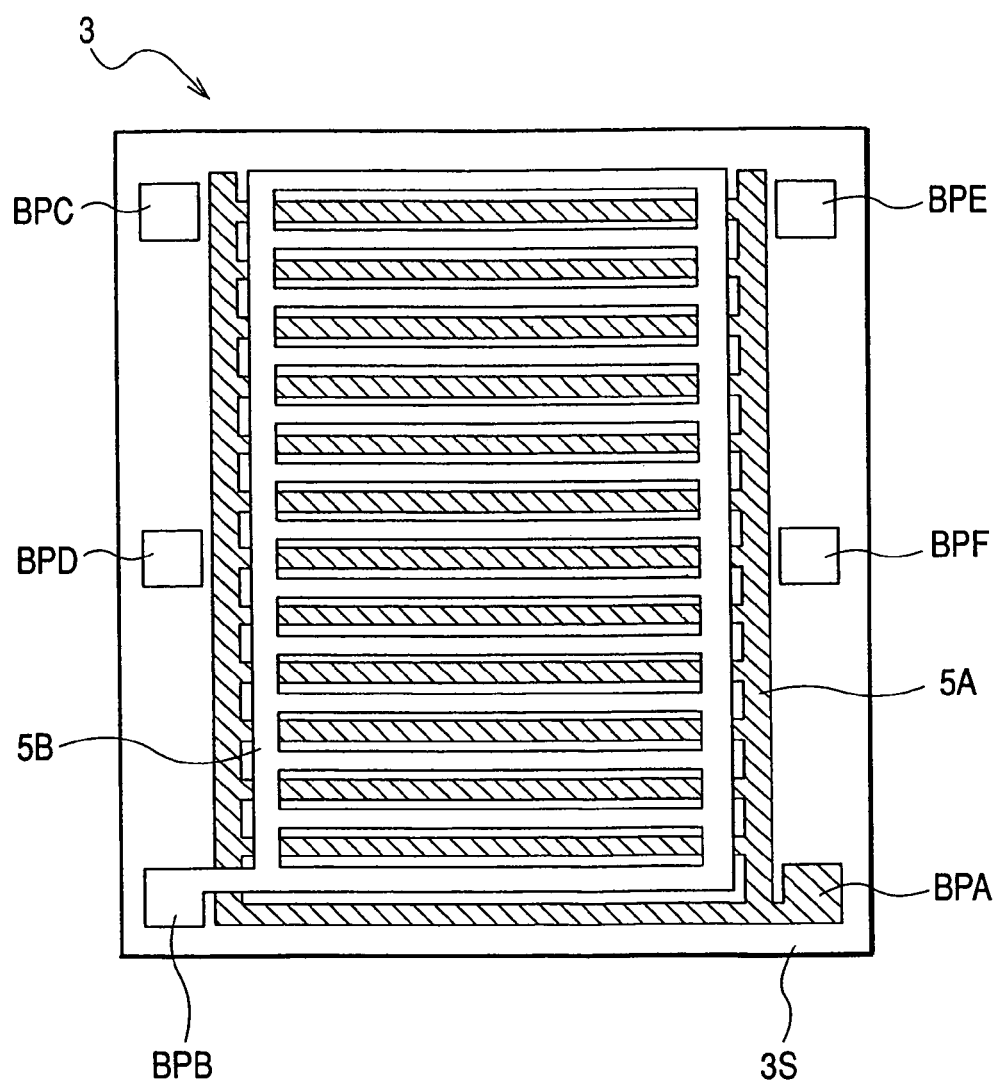
FIG. 7 is a plan view of a semiconductor chip which constitutes an IC card (a semiconductor device) according to a second embodiment of the present invention.

FIG. 7 is a plan view of a chip 3 which constitutes an IC card according to a second embodiment of the present invention.

In this second embodiment, as shown in FIG. 7, wiring lines 5A and 5B for the supply voltage are substantially in the shape of a ladder or grid, as seen in plan view. More specifically, the wiring lines 5A and 5B each comprise two wiring portions extending in parallel with each other vertically, as seen in FIG. 7, and plural wiring portions extending perpendicularly to the two wiring portions and arranged at predetermined intervals vertically, as seen in FIG. 7, both wiring portions being connected together at their intersecting points.

However, in this second embodiment, the wiring lines 5A and 5B are formed respectively in different wiring layers with an interlayer insulating film being disposed therebetween. In the illustrated example, the wiring line 5B for the supply voltage on a high potential side overlies the wiring line 5A for the supply voltage on a low potential side. The planar positions of the wiring lines 5A and 5B are shifted relative to each other so that the wiring line 5B is partially located in gaps of the wiring line 5A. That is, also in this second embodiment, elements on the main surface of the chip 3 are covered closely without leaving any gap by the wiring lines 5A and 5B. Therefore, even if an attempt is made to apply a needle to a signal line which underlies the wiring lines 5A and 5B for the purpose of analyzing information stored in the chip 3, it cannot be done because access is obstructed by both wiring lines 5A and 5B.

Besides, observing from the exterior such signal lines and elements as underlie the wiring lines 5A and 5B is very difficult because all elements are obstructed by both wiring lines 5A and 5B. Thus, also in this second embodiment, for analyzing information stored in the chip 3, it is necessary to remove the wiring lines 5A and 5B for the supply voltage. However, if both wiring lines 5A and 5B are removed, the integrated circuit does not operate, and it is impossible to analyze information stored in the chip 3 for the same reason as that stated in connection with the previous first embodiment. Thus, it is possible to improve the security of information stored in the IC card.

THIRD EMBODIMENT

Figure 8:
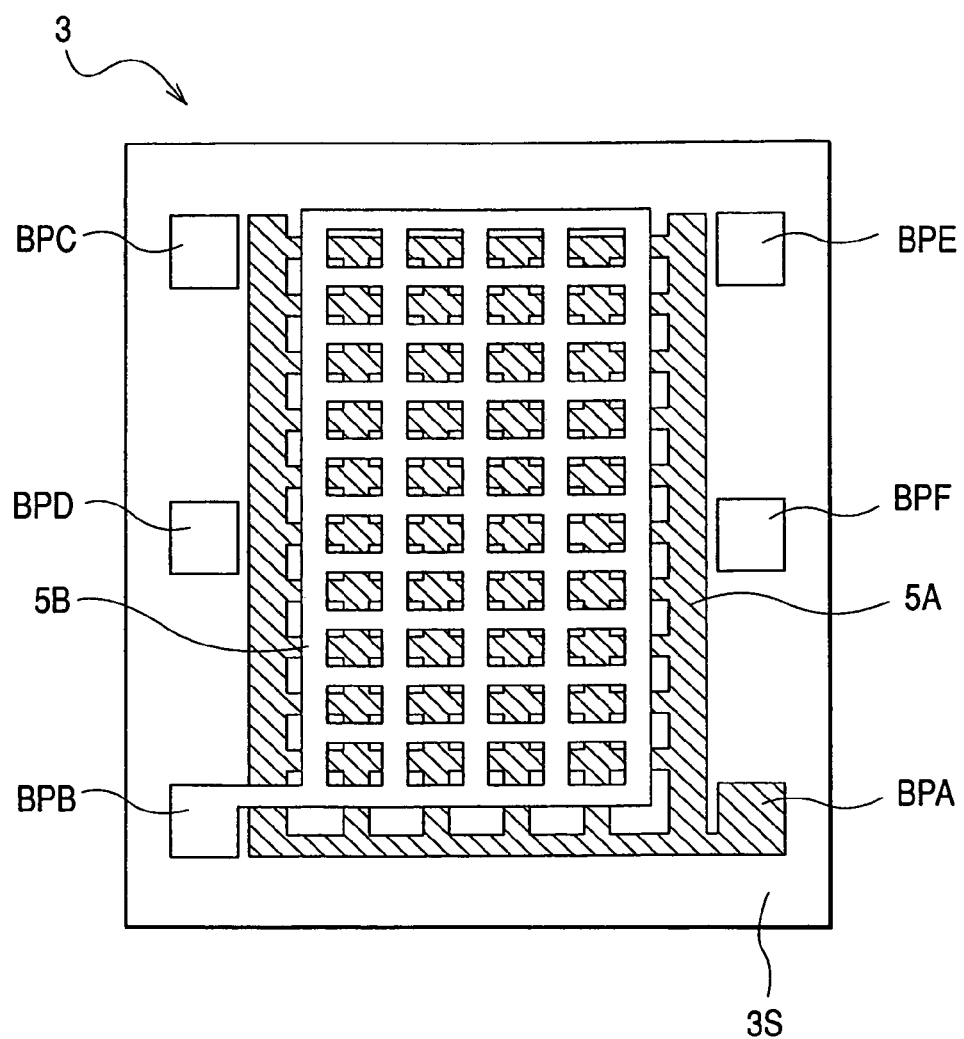
FIG. 8 is a plan view of a semiconductor chip which constitutes an IC card according to a third embodiment of the present invention.

FIG. 8 is a plan view of a chip 3 which constitutes an IC card according to a third embodiment of the present invention.

In this third embodiment, as shown in FIG. 8, wiring lines 5A and 5B for the supply voltage are substantially in the shape of a lattice as seen in plan view. More specifically, the wiring lines 5A and 5B each comprise plural wiring portions extending vertically, as seen in FIG. 8, in parallel with one another and plural wiring portions extending perpendicularly thereto, both wiring portions being connected together at their intersecting points.

Also, in this third embodiment, the wiring lines 5A and 5B are formed respectively in different wiring layers. Also, in the illustrated example, the wiring lines 5B for the supply voltage on a high potential side overlie the wiring lines 5A for the supply voltage on a low potential side. Further, also in this third embodiment, the planar positions of the wiring lines 5A and 5B for the supply voltage are shifted relative to each other so that the wiring line 5B is partially disposed in gaps of the wiring line 5A. With this arrangement in this third embodiment, it is also possible to obtain the same effect as that obtained in the first and second embodiments.

FOURTH EMBODIMENT

Figure 9:
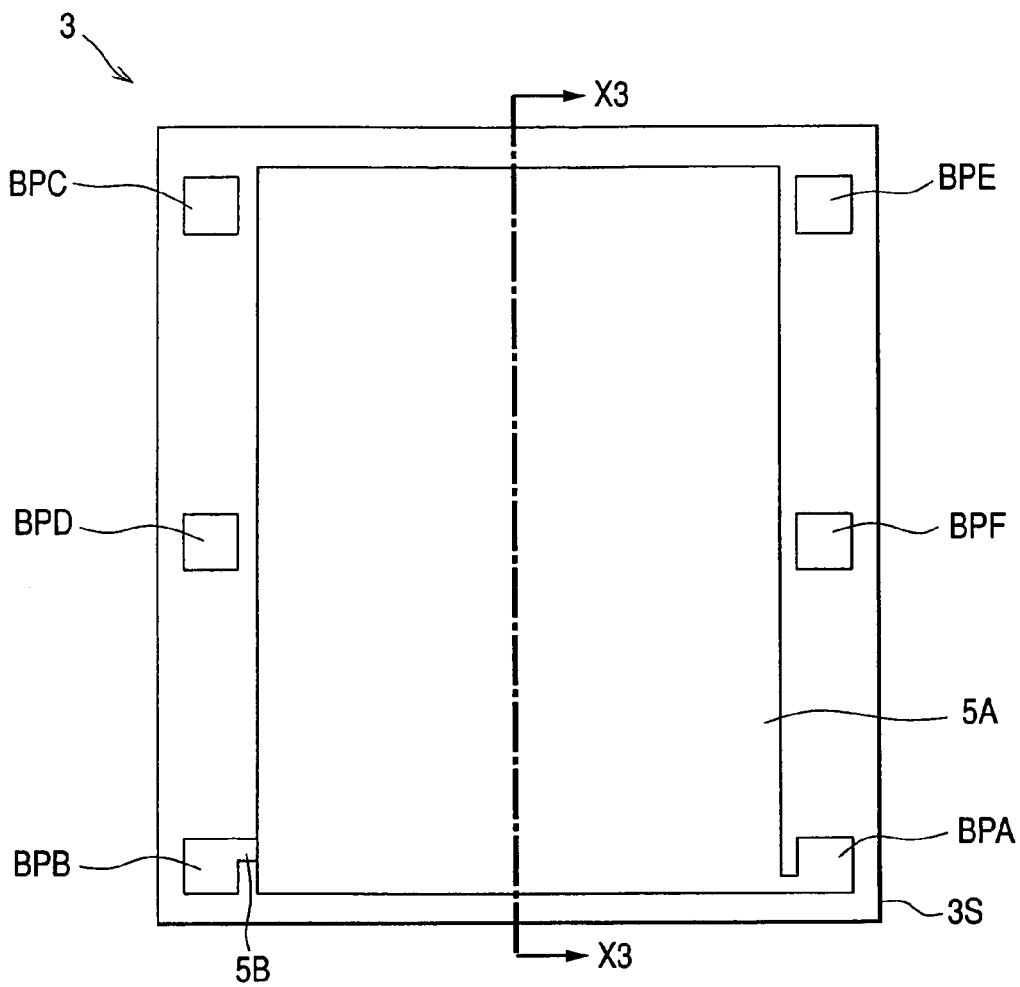
FIG. 9 is a plan view of a semiconductor chip which constitutes an IC card according to a fourth embodiment of the present invention.
Figure 10:
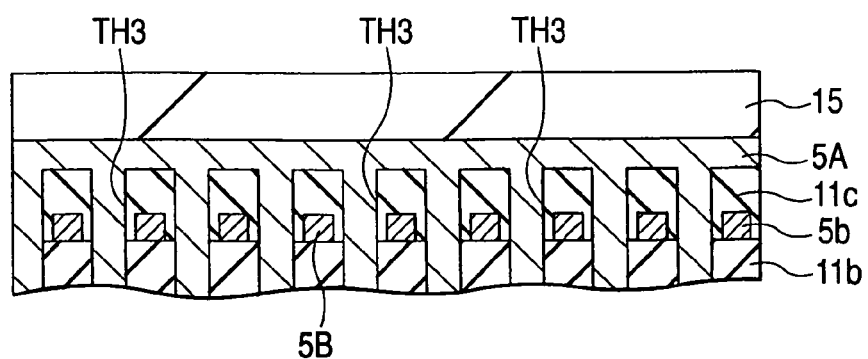
FIG. 10 is a sectional view taken on line X3-X3 in FIG. 9.

FIG. 9 is a plan view of a chip 3 which constitutes an IC card according to a fourth embodiment of the present invention, and FIG. 10 is a sectional view taken on line X3-X3 in FIG. 9.

In this fourth embodiment, as shown in FIG. 9, a wiring line 5A for the supply voltage on a low potential side is solid wiring. That is, the wiring line 5A is formed in a quadrangular shape, as seen in plan view, so as to cover the greater part of a main surface of a chip 3. Of course, a wiring line 5B for the supply voltage on a high potential side may be made as a solid wiring as well. In this embodiment, the wiring line 5B for the supply voltage on a high potential side is disposed in a wiring layer which underlies the wiring line 5A for supply voltage on a low potential side. Since through holes TH3 for pulling down the wiring line 5A to the underlying layer are to be formed, the wiring line 5B is not made as a solid wiring, but is formed as an ordinary band-like or wide wiring line.

Also, in this fourth embodiment, which is constructed as described above, the same effect can be obtained as that obtained in the first and second embodiments.

FIFTH EMBODIMENT

Figure 11:
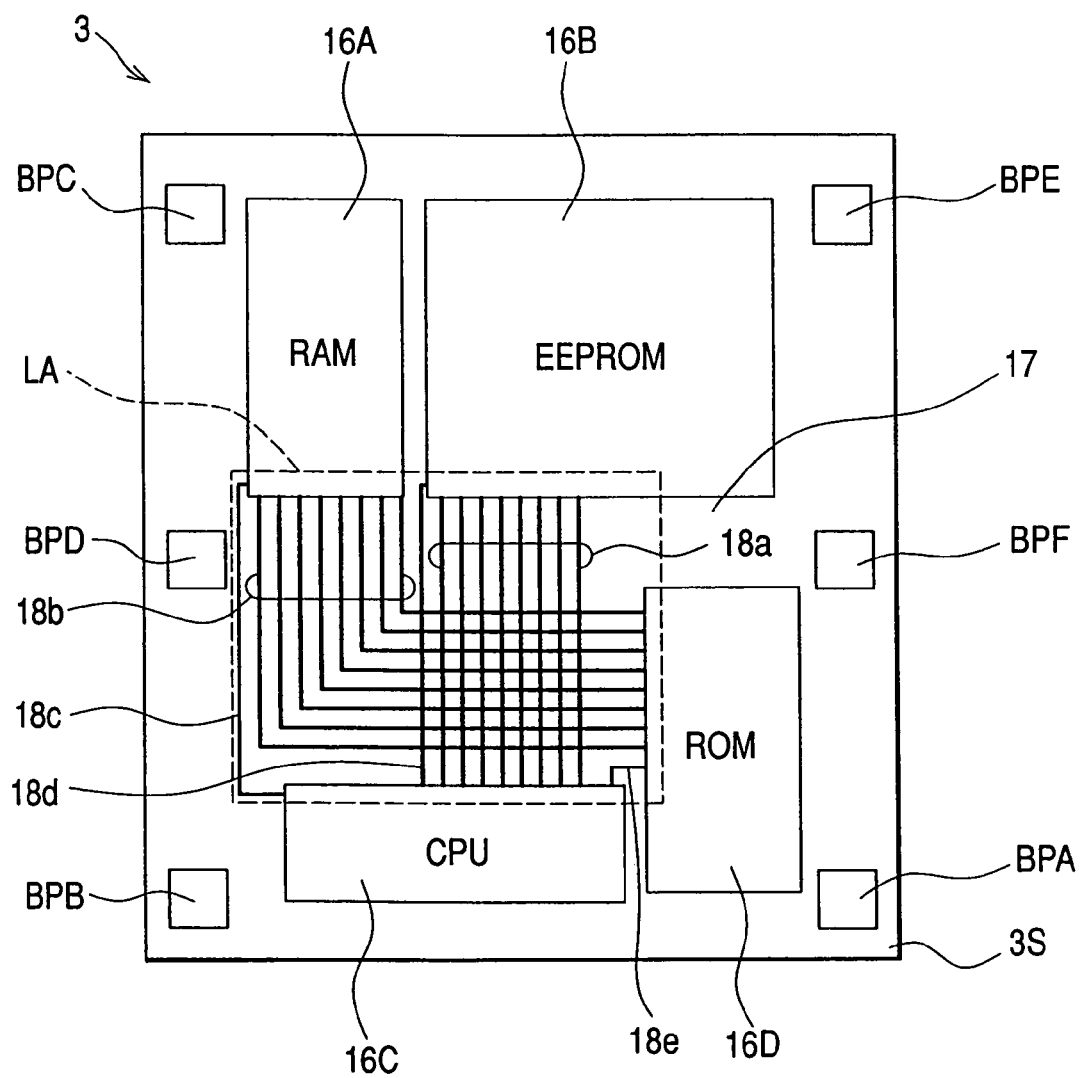
FIG. 11 is a plan view of a semiconductor chip which constitutes an IC card according to a fifth embodiment of the present invention.

FIG. 11 is a plan view showing a chip 3 which constitutes an IC card according to a fifth embodiment of the present invention. Plural circuit blocks 16A to 16D are arranged on a main surface of the chip 3. In the circuit block 16A, there is a RAM (Random Access Memory) such as, for example, a DRAM (Dynamic Random Access Memory), a SRAM (Static Random Access Memory), a FRAM (Ferroelectric Random Access Memory). In the circuit block 16B, there is an EEPROM (Electric Erasable Programmable Read Only Memory), for example. Various items of information, such as those related to finance, distribution, medical care, traffic, or transportation, are stored in the circuit block 16B. In the circuit block 16C, there is a CPU (Central Processing Unit), for example. The operation of the integrated circuit within the chip 3 is controlled by the circuit block 16C. In the circuit block 16D, there is a ROM (Read Only Memory), for example. Information items necessary for operation of the integrated circuit are stored in the circuit block 16D. A wiring region 17 is disposed among the circuit blocks 16A to 16D. In the wiring region 17, there are arranged such signal lines as bus lines 18a, 18b and control signal lines 18c to 18e. The bus lines 18a and 18b are each constituted by a group of plural signal lines juxtaposed at approximately equal intervals.

In this fifth embodiment, the wiring lines 5A and 5B for the supply voltage are arranged so as to partially cover a broken-line area LA in the wiring region 17. That is, both wiring lines 5A and 5B are arranged so as to partially cover signal lines used for the analysis of information, such as bus lines 18a, 18b and control signal lines 18c to 18e.

Also, in this fifth embodiment, as is the case with the previous first to fourth embodiments, the wiring lines 5A and 5B for the supply voltage must be removed to obtain access for analyzing information. If both wiring lines 5A and 5B are removed, however, for the reason stated above, the integrated circuit does not operate, and it is impossible to analyze the information stored in the chip. Thus, it is possible to improve the security of information stored in the IC card 1.

In this fifth embodiment, moreover, the wiring lines for the supply voltage, which function as a shield, may be disposed partially, and the other area may be used as a power supply wiring area or signal wiring area for the other circuit blocks 16A to 16D. Thus, even if there are wiring lines 5A and 5B for the supply voltage which function as a shield, it is possible to ensure the overall wiring layout freedom.

SIXTH EMBODIMENT

Figure 12:
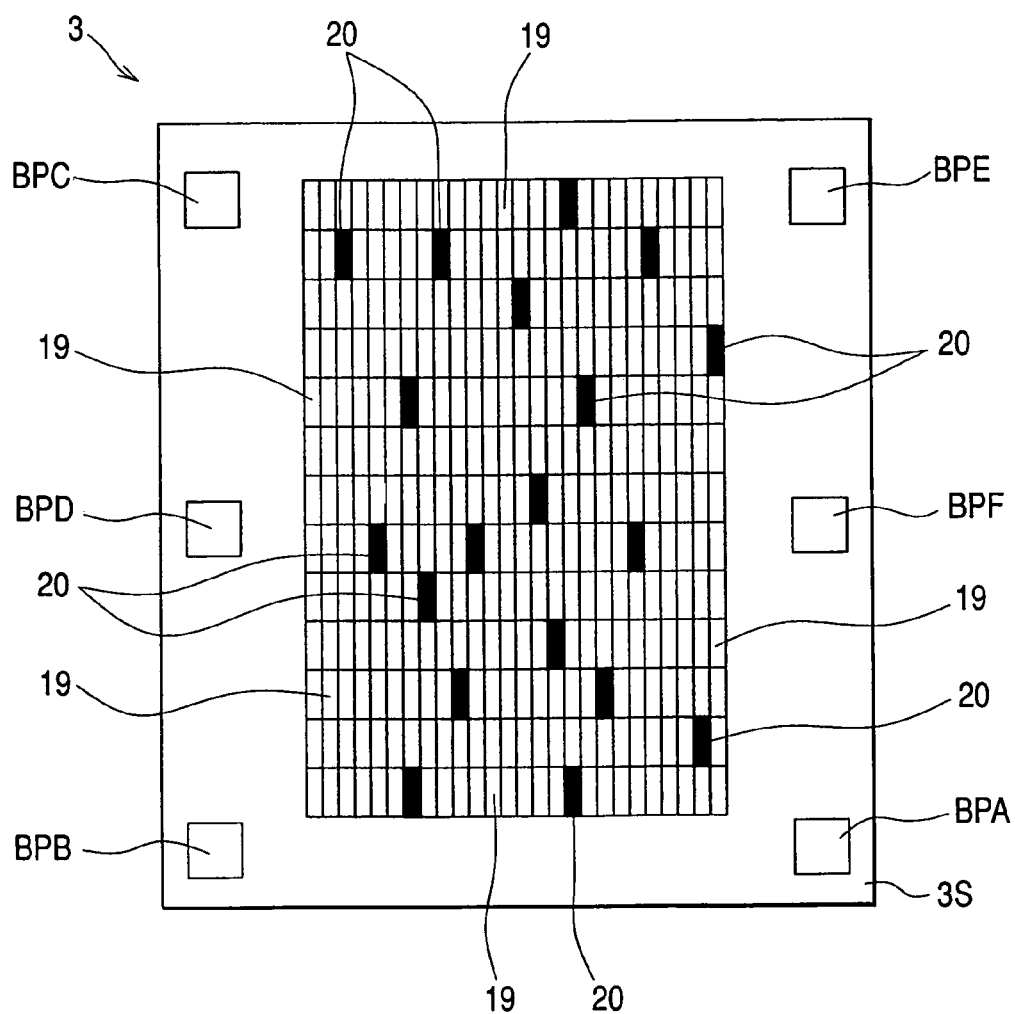
FIG. 12 is a plan view of a semiconductor chip which constitutes an IC card according to a sixth embodiment of the present invention.

FIG. 12 is a plan view of a chip 3 which constitutes an IC card according to a sixth embodiment of the present invention. On a main surface of the chip 3, plural circuit cells 19 are arranged side by side without any gap, and they are disposed regularly in both vertical and transverse directions, as seen in FIG. 12. Plural elements are arranged in each of the circuit cells 19.

Although a description has been given relative to the first to fifth embodiments concerning a technique for protecting information stored in the chip 3 on the assumption that all of the wiring lines 5A and 5B for the supply voltage, which function as a shield, are removed, it is possible to adopt another method wherein the wiring lines 5A and 5B are partially removed using an energy beam, such as a FIB (Focused Ion Beam), for example, after which the analysis of information is performed. In this sixth embodiment, for preventing the analysis of information based on such partial removal of the power supply lines, for example, plural processing detector circuits 20 are provided on a main surface of the chip 3.

With provision of the processing detector circuits 20, once the wiring lines 5A and 5B for the supply voltage in the previous first to fifth embodiments, or a specific wiring line formed on the chip 3, is subjected to processing (complete or partial cutting), the processing is detected, and the integrated circuit in the chip 3 is reset so that it is made unable to operate, thereby preventing the analysis of information. With such processing detector circuits 20, it is possible to prevent the analysis of information stored in the IC card 1, and, hence, it is possible to improve the security of information stored on the card.

In this sixth embodiment, plural processing detector circuits 20 are dispersed irregularly within the main surface of the chip 3, whereby it is possible to make it difficult to identify the positions of the processing detector circuits 20 in the chip 3. In this regard, for analyzing information stored in the chip 3, it is conceivable that, after destroying the processing detector circuits 20, the foregoing wiring lines which function as a shield can be removed, followed by analysis of information stored in the chip 3. Therefore, if plural processing detector circuits 20 are arranged in an irregularly dispersed fashion, it becomes difficult to destroy all of the processing detector circuits, and, hence, it is possible to make the analysis of information difficult. As a result, it becomes possible to further improve the security of information stored in the chip 3. Once the wiring lines 5A and 5B for the supply voltage are subjected to processing (complete or partial cutting), the processing detector circuits 20 are able to detect a change in potential (or resistance) of the wiring lines 5A and 5B. That is, the processing detector circuits 20 are used for the detection of tampering with the wiring lines 5A and 5B.

Figures 13, 14:
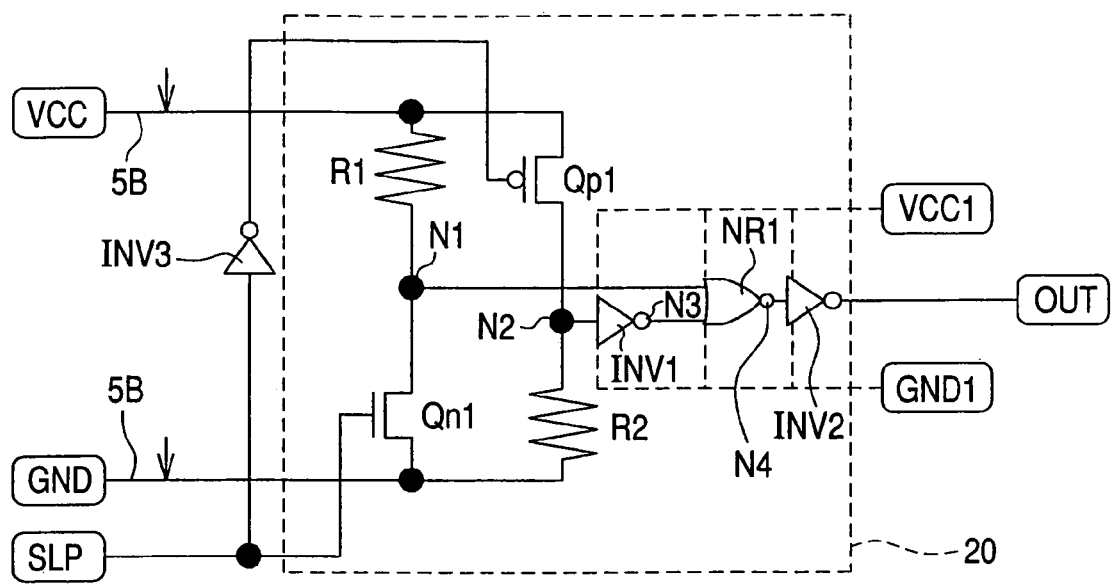
FIG. 13 is a schematic circuit diagram showing an example of a processing detector circuit illustrated in FIG. 12.
FIG. 14 is a diagram which illustrates the operation of the processing is detector circuit illustrated in FIG. 13.

FIG. 13 shows an example of a circuit diagram representing each of the processing detector circuits 20. According to the illustrated circuit configuration, even if one of the wiring line 5A for the supply voltage (GND) on a low potential side and the wiring line 5B for the supply voltage (VCC) on a high potential side is subjected to processing, the processing can be detected by one processing detector circuit 20.

The processing detector circuit 20 has high resistors R1 and R2, nMIS Qn1, pMIS Qp1, an inverter circuit INV1, a nor circuit NR1, and an inverter circuit INV2. The processing detector circuit 20 is constituted by the elements arranged within each circuit cell 19, and a circuit is formed such that the elements are interconnected by wiring lines which underlie the wiring layer of the wiring lines 5A and 5B for the supply voltage. The wiring lines 5A and 5B for the supply voltage serve as inputs of the processing detector circuit 20. Supply voltages VCC1 and GND1, which serve as drive voltages for the processing detector circuit 20, should be fed along a route different from the wiring lines 5A and 5B, or else, if any of the wiring lines 5A and 5B is cut off, the processing detector circuit 20 itself will fail to operate and will no longer function as a detector circuit. In the illustrated example, the supply voltage GND1 is equal (for example, 0V or so) to the voltage applied to the wiring line 5A for the supply voltage on the low potential side, and the supply voltage VCC1 is equal (for example, 1.8V, 3.0V, or 5.0V or so) to the voltage applied to the wiring line 5B for the supply voltage on the high potential side.

A sleep terminal SLP is electrically connected to a gate electrode of the nMIS Qn1, and it is also connected to a gate electrode of the pMIS Qp1 through an inverter circuit INV3. If a voltage of "High (simply H herenafter)" level is applied to the sleep terminal SLP, both the nMIS Qn1 and the pMIS Qn1 turn ON, and the processing detector circuit 20 performs its normal operation. On the other hand, if a voltage of "Low (simply L hereinafter) level is applied to the sleep terminal SLP, both the nMIS Qn1 and the pMIS Qp turn OFF, and the processing detector circuit 20 assumes a sleep state. The reference marks N1 to N4 denote nodes and the reference mark OUT denotes an output of the processing detector circuit 20.

FIG. 14 shows potentials of the nodes N1 to N4 and the output OUT in various operation modes of each processing detector circuit 20 shown in FIG. 13. Mode M1 is a normal operation mode of the processing detector circuit 20, i.e., a processing-free state of the wiring lines 5A and 5B. In this case, the nodes N1, N2, and N3 assume L, H, and L levels, respectively, so that the output node N4 of NOR circuit NR1 becomes H, and after inversion in the inverter circuit INV2, a signal of L level is provided at the output OUT of the processing detector circuit 20. In this case, the integrated circuit in the chip 3 is not reset.

In mode M2, the wiring line 5B on the high potential side is cut off, although the wiring line 5A on the low potential side is not cut off. In this case, the nodes N2 and N3 assume L and H levels, respectively, so that the output node N4 of the NOR circuit NR1 becomes L, and after inversion in the inverter circuit INV 2, H is provided at the output OUT of the processing detector circuit 20. As a result, the integrated circuit in the chip 3 is reset and does not operate, thus making it possible to prevent the analysis of information.

Further, in mode M3, the wiring line 5A on the low potential side is cut off although the wiring line 5B on a high potential side is not cut off. In this case, the node N1 becomes H and the output node N4 of the NOR circuit NR1 becomes L, so that, after inversion in the inverter circuit INV2, a signal of H level is provided at the output OUT of the processing detector circuit 20. As a result, as in the case of mode M2, the integrated circuit of the chip 3 is reset and does not operate, thereby making the analysis of information impossible.

Figure 15:
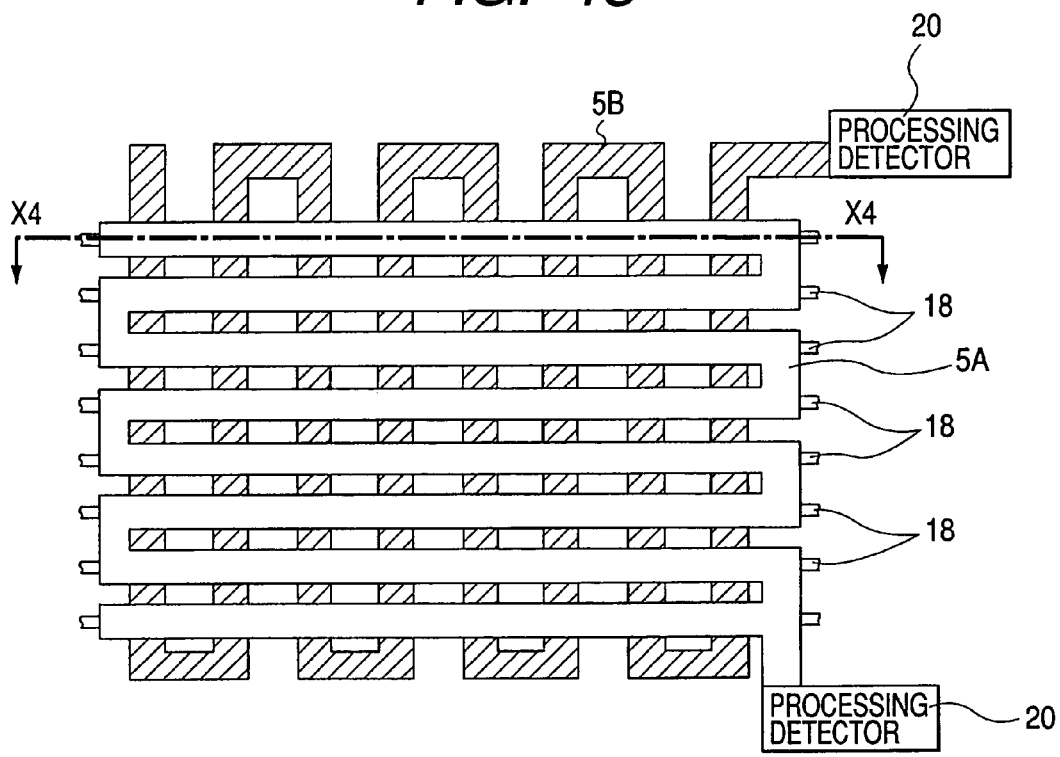
FIG. 15 is an enlarged plan view of a principal portion of the semiconductor chip illustrated in FIG. 12.
Figure 16:
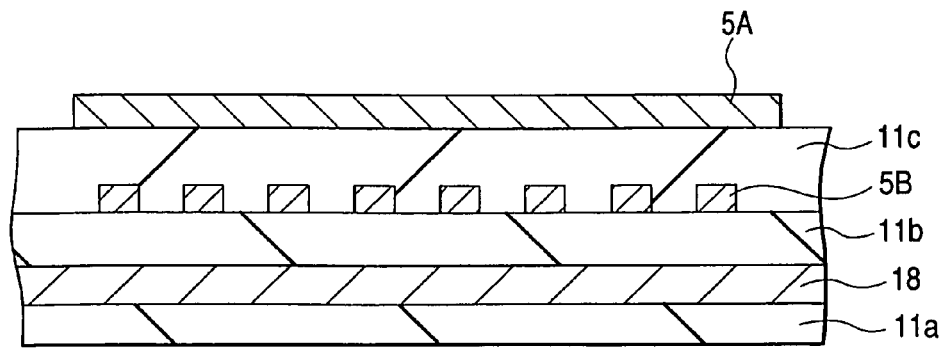
FIG. 16 is a sectional view taken on line X4-X4 in FIG. 15.

FIG. 15 shows an example of the layout of the wirings 5A and 5B for the supply voltage, which function as a shield, and FIG. 16 is a sectional view taken on line X4-X4 in FIG. 15. Although these figures show an example of a processing detector circuit 20 using either the wiring line 5A or 5B as an input, it is possible to use a processing detector circuit 20 as referred to above, which uses both wiring lines 5A and 5B as inputs.

In this sixth embodiment, each of the wiring lines 5A and 5B is constituted by a respective wiring line which meanders so as to cover underlying wiring lines 18. That is, each of the wiring lines 5A and 5B is constituted as a single continuous path so that, when cut off, the cut-off wiring portions are completely isolated from each other. Further, though the invention is not specially so limited, processing detector circuits 20 are electrically connected to terminal ends of such wiring lines 5A and 5B. If the wiring lines 5A and 5B are arranged in a frame- or lattice-like layout, as described previously, even if they are cut off partially, it is possible to feed supply voltage through the other wiring portions, and, therefore, the input potential of each processing detector circuit 20 becomes constant, with the result that, even when the wirings 5A and 5B are subjected to processing, the processing cannot be detected. On the other hand, in this sixth embodiment, the wirings 5A and 5B are each constituted by a wiring line disposed as a single continuous path. In analyzing information, therefore, if part of the wiring lines 5A and 5B is cut off with an energy beam, such as a FIB, it becomes no longer possible to apply a supply voltage to an input of each processing detector circuit 20, and the input potential of the circuit 20 changes. As a result, it becomes possible to carry out a processing detection by the processing detector circuit 20 as described above, and it is possible to prevent the analysis of information stored in the chip 3.

In the illustrated example being considered, the wiring lines 5A and 5B are provided in different wiring layers with an interlayer insulating film disposed therebetween, though the invention is not specially limited. That is, the wiring line 5A overlies the wiring line 5B. Both wiring lines 5A and 5B are arranged so as to intersect with each other, as seen in plan view. More specifically, since the underlying wiring lines 18 are covered in a gap-free manner with the wirings 5A and 5B for the supply voltage, even if an attempt is made to apply a needle to the wiring lines 18 which underlie the wiring lines 5A and 5B for the purpose of analyzing information stored in the chip 3, this will not be successful because the needle is obstructed by both wiring lines 5A and 5B. Further, observing from the exterior the signal lines and elements which underlie the wiring lines 5A and 5B for supply voltage is extremely difficult because they are obstructed by both wiring lines 5A and 5B. Therefore, also in the case of this sixth embodiment, it is necessary to process both of the wiring lines 5A and 5B for the supply voltage in case of analyzing information stored in the chip 3. But if such is done, the processing is detected by the processing detector circuits 20, with the result that the integrated circuit fails to operate, and it is impossible to analyze information stored in the chip 3. Thus, it is possible to improve the security of information stored in the IC card 1. As an example of the wiring lines 18, mention may be made of a desired signal line, such as a bus line (including control bus, data bus, or address bus) or control line.

The underlying processing detector circuits 20 may be covered with the meandering wiring lines 5A and 5B. For analyzing information stored in the chip 3, it is also possible to adopt a method involving the destroying of the processing detector circuits 20 and subsequent removal of wiring lines 5A, 5B to effect analysis of information. However, if the processing detector circuits 20 are covered with the wiring lines 5A and 5B, as described above, it is necessary to cut off the wiring lines 5A and 5B for destroying the processing detector circuits 20, that is, it is possible to detect processing of the wiring lines 5A and 5B before destruction of the processing detector circuits 20, and, hence, it is possible to prevent the analysis of information.

Such a continuous line stroke construction of the wiring lines 5A and 5B is also applicable to the case where the processing detector circuits 20 are not provided. More specifically, if the greater part of the main surface of the chip 3, or only the wiring region, is covered with such continuous wiring lines 5A and 5B as illustrated in FIG. 16, even if a part of the wiring lines 5A and 5B is cut off, there will be no feed of supply voltage to the integrated circuit in the chip 3; and, hence, the integrated circuit fails to operate, whereby it is possible to prevent the analysis of information.

Both wiring lines 5A and 5B may be constituted so as to have respective planar patterns that are different from each other, whereby it is possible to make the analysis of information difficult.

Figure 40:
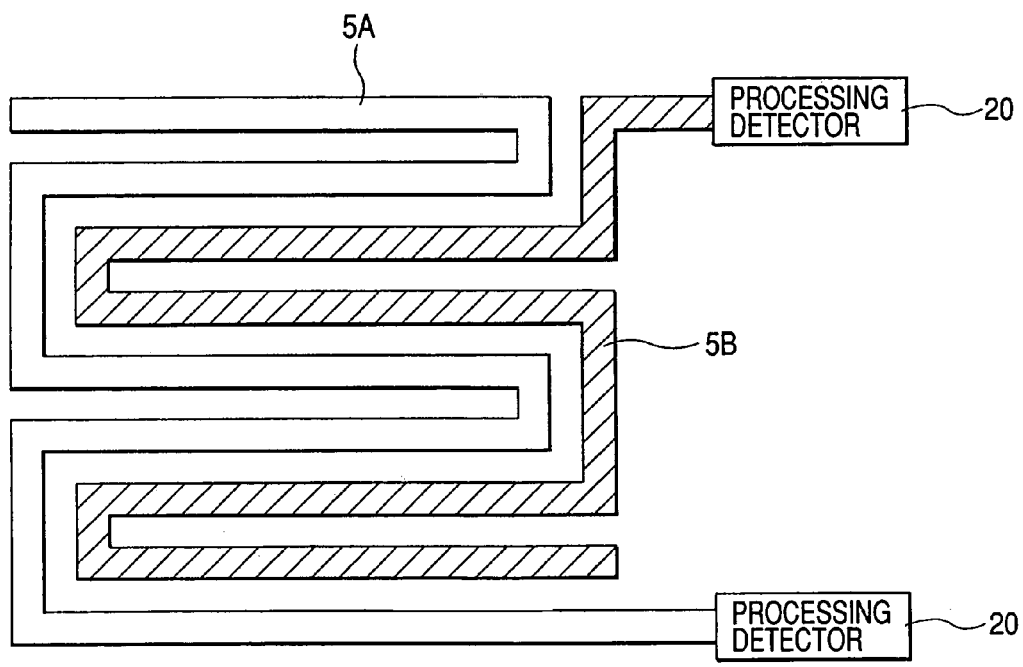
FIG. 40 is an enlarged plan view of a principal portion of a semiconductor chip which constitutes an IC card according to a nineteenth embodiment of the present invention.

Although in this embodiment the wiring lines 5A and 5B are provided in different wiring layers, both wiring lines may be provided in the same wiring layer, as shown in FIG. 40, whereby there is obtained the same effect as that obtained in this embodiment.

Moreover, as shown in FIG. 40, by constructing the wiring lines 5A and 5B so as to have respective planar patterns that are different from each other, it is possible to make the analysis of information more difficult.

The same wiring layer for both wiring lines 5A and 5B, as shown in FIG. 40, may be provided in a plural number and plural wiring layers may be laminated together. That is, the wiring lines 5A and 5B shown in FIG. 40 may be provided in each of plural wiring layers. In this case, by making the planar patterns of both of the wiring lines 5A and 5B in one wiring layer different from that in another wiring layer, it is possible to make the analysis of information more difficult.

Moreover, by laminating the wiring layer having the planar pattern shown in FIG. 15 and the wiring layer having the planar pattern shown in FIG. 40 to each other, it is possible to make the analysis of information even more difficult. Further, the wiring patterns of wirings 5A and 5B shown in FIG. 40 may be provided in a wiring layer that is formed between the wiring layer of wiring line 5B and that of wiring line 5B shown in FIG. 15. In this case, by forming the wiring pattern of wiring line 5B shown in FIG. 15, that of the wiring line 5A shown in FIG. 15, and the wiring patterns of wiring lines 5A and 5B, with use of planar patterns that are different from one another, it is possible to make the analysis of information that much more difficult.

SEVENTH EMBODIMENT

Figure 17:
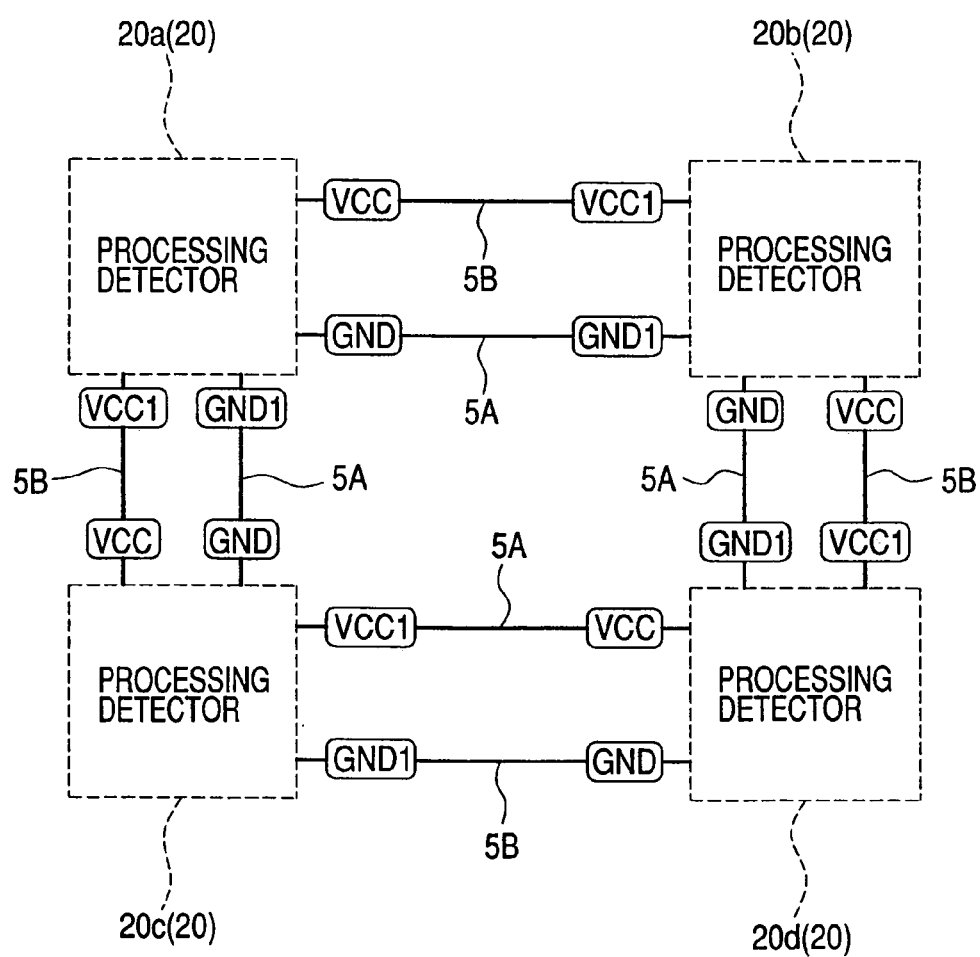
FIG. 17 is a diagram showing an example of the connection configuration of a processing detector circuit in an IC card according to a seventh embodiment of the present invention.

In the sixth embodiment, the route of the wiring for supply voltage functioning as a processing detection wiring and the route of the wiring for the supply voltage to feed a drive voltage to each processing detector circuit are provided separate from each other. But in this seventh embodiment, as shown in FIG. 17, the supply voltages GND and VCC of the wiring lines 5A and 5B, which function as processing detection lines in one processing is detector circuit (20a to 20d), and the supply voltages GND1 and VCC1 which serve as drive voltages for the other processing detector circuits 20 (20a to 20d), are fed through an integral supply route. More specifically, wiring lines 5A and 5B for processing detection input in one processing detector circuit 20 are provided as wiring lines 5A and 5B for the supply of drive voltage in another processing detector circuit 20. In the illustrated example, the processing detector circuits 20a to 20d are arranged so as to form a loop.

In an attempt to analyze information stored in the IC card 1, it is possible to adopt a method wherein the supply voltages GND1 and VCC1 are cut off (or are prevented from being supplied) so as to prevent operation of the processing detector circuits 20, and, thereafter, the wiring lines 5A and 5B are cut off to analyze the information on the card. To prevent use of such a method, this seventh embodiment adopts a construction wherein, if the wiring lines for feeding the supply voltages GND1 and VCC1 in one processing detector circuit 20 are cut off (or prevented from being supplied), the cutting is detected by another processing detector circuit 20. For example, if the wiring lines for the supply of the supply voltages GND1 and VCC1, which serve as the drive voltage for the processing detector circuit 20b, are cut off, the processing detector circuit 20a detects the cutting and operates to prevent operation of the integrated circuit in the chip 3. Thus, the analysis of information can be prevented, and it is possible to further improve the security of the IC card 1.

Also in this seventh embodiment, the wiring lines 5A and 5B may be configured so as to meander, as shown in FIG. 16, to cover the underlying processing detector circuits 20. With this construction, if an attempt is made to destroy the processing detector circuits 20, the same circuits detect it and prevent operation of the integrated circuit in the chip 2, whereby the analysis of information can be prevented.

EIGHTH EMBODIMENT

In this eighth embodiment, a description will be given of an example in which the supply voltage wiring lines having a shielding function and wiring lines for providing an active shield are arranged in different planar positions. As will be described later, the active shield is a shield of the type described in connection with the sixth and seventh embodiments.

Figure 19:
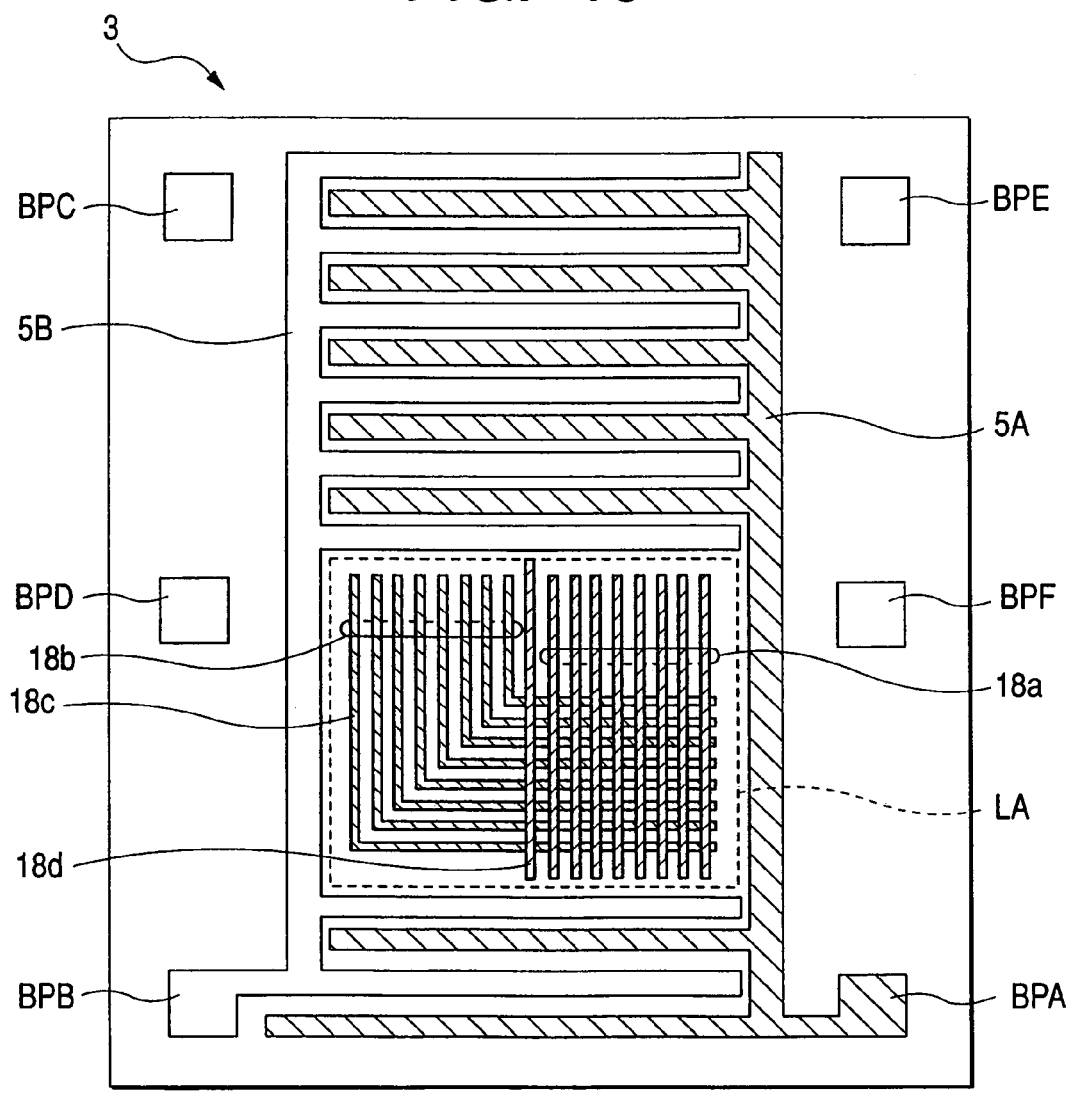
FIG. 19 is a plan view of a semiconductor chip which constitutes a semiconductor device according to an eighth embodiment of the present invention.

FIG. 19 is a plan view of a chip 3 which constitutes a semiconductor device according to an eighth embodiment of the present invention. The wiring lines 5A and 5b shown in FIG. 19 correspond to the power supply wiring lines having a shielding function, as has been explained in connection with the first to fifth embodiments. In FIG. 19, as is the case with the first embodiment, the wiring lines 5A and 5B are formed in the same layer (top wiring layer). However, the wiring lines 5A and 5B may be formed in different layers, as provided in the second embodiment. The wiring lines 5A and 5B may have a planar shape as described in conjunction with the third and fourth embodiments.

In the arrangement of FIG. 19, the wiring lines 5A and 5B are arranged so as to mainly cover a part (upper side of the chip 3 in the same figure) of a main surface of the chip 3 and are not arranged in an area (second area) LA. In the same figure there is illustrated an area wherein signal lines used in the analysis of information, such as bus lines 18a, 18b and control signal lines 18c to 18e, are arranged. In this eighth embodiment, wiring lines for providing an active shield constituted by the same wiring layer as that of the wiring lines 5A and 5B are arranged in the area LA. That is, the integrated circuit (comprising memory circuits 3a and a logic circuit group 3b) is covered with the supply voltage wiring lines 5A and 5B, that are formed in the area other than the area LA and have a shielding function, and also with wiring lines for providing an active shield formed in the area LA.

The wiring lines 5A and 5B, which have a shielding function, may be constituted by the planar patterns of the wiring lines 5A and 5B shown in connection with the first to fifth embodiments and plural wiring layers, and the wiring lines for providing an active shield may be constituted by the planar patterns of the wiring lines 5A and 5B for an active shield shown in connection with the sixth embodiment and plural wiring layers. That is, the wiring lines for the supply voltage having a shielding function may be constituted by a single wiring layer or plural wiring layers and the wiring lines for providing an active shield may be constituted by a single wiring layer or plural wiring layers. Further, the wiring lines having a shielding function and the wiring lines for providing an active shield each have at least one and the same wiring layer, whereby the wiring lines can be arranged so as to cover the integrated circuit (memory circuits 3a and a logic circuit group 3b) with the same wiring layer, thus making the analysis of information more difficult.

The active shield is a shield as described in connection with the sixth and seventh embodiments. That is, as described in connection with the sixth embodiment, the active shield has a function such that, if specific wiring lines (wiring lines for an active shield) which constitute an active shield are processed (cut off completely or partially), the cutting is detected and the integrated circuit in the chip 3 is reset so as to prevent operation of the integrated circuit, thereby preventing analysis of information on the card. Signal lines used for the analysis of information, such as bus lines 18a, 18b and control signal lines 18c to 18e in the region LA, are protected by the active shield system in question. According to this system, if wiring lines for the active shield are processed (cut off completely or partially) with an FIB (Focused Ion Beam), for example, a potential change in the wiring lines for the active shield is detected and a detected signal is inputted to a control circuit which controls the whole integrated circuit in the chip 3 to activate a reset signal in the integrated circuit, i.e., to reset the integrated circuit. As a result, the integrated circuit in the chip 3 fails to operate, and it is impossible to analyze information. The reset state indicates a state in which the chip does not operate, i.e., a locked state. However, what is important is to prevent operation of the integrated circuit in the chip 3 when the wiring lines for the active shield are processed. It is not that there is a limitation on the reset state of the IC card. For example, an improvement may be made such that, once the wiring lines for an active shied are processed, there is a shift in operation to a dead mode in which the integrated circuit in the chip 3 will never operate. As a specific example, a fuse circuit serving as an active shield system will be provided within the chip 3, and once the wiring lines for active shield are processed, the fuse in the fuse circuit is cut off automatically and the integrated circuit in the chip 3 is destroyed, so that it will never be operable (this is also the case with other embodiments with respect to reset).

The wiring lines for the active shield are arranged through an interlayer insulating film in a layer which overlies the layer of signal lines, such as bus lines 18a, 18b and control signal lines 18c to 18e. That is, the wiring lines for the active shield are arranged in such a position that processing (complete or partial cutting) becomes inevitable at the time of any attempt at analyzing information through access to the signal lines. As a result, for analyzing information through access to the signal lines, it is necessary to process the wiring lines for the active shield, whereby it is possible to make it more difficult to analyze information in the IC card through access to the signal lines. Thus, in this eighth embodiment, by arranging different types (or methods) of shields (the shield using the supply voltage wiring lines 5A, 5B and the wiring lines for active shield) in the same wiring layer, it is possible to make decryption, or codebreaking, of the shield system difficult, and it is also possible to make efforts at cancellation or causing failure of the shield system to operate more difficult, so that the analysis of information stored in the IC card can be made more difficult. Moreover, even if various types (or methods) of shield systems are formed by patterning the wiring lines for the active shield at the time of patterning the wiring lines 5A and 5B, there is no great increase in the time required for manufacturing the semiconductor device. The wiring lines for the active shield are supplied with the same voltage as that for the wiring lines 5A and 5B shown in FIG. 19, for example. That is, the wiring lines for the active shield are supplied with a low potential-side supply voltage (GND, for example, 0V) and a high potential-side supply voltage (VCC, for example, 1.8V, 3.0V, 5.0V), or a voltage other than those supply voltages. Alternatively, a portion of the wiring lines for the active shield may be supplied with a low potential-side supply voltage and another portion thereof may be supplied with a high potential-side supply voltage. Further, a portion of the wiring lines for the active shield may be supplied with a potential other than the above-mentioned supply voltages. By thus disposing plural types of wiring lines for the active shield, having different in supply potentials, within the same chip, it is possible to make decryption of the active shield system difficult; and, hence, it is possible to make efforts at cancellation or causing failure of the active shield system to operate more difficult, so that it is possible to make the analysis of information stored in the IC card more difficult.

Figure 20:
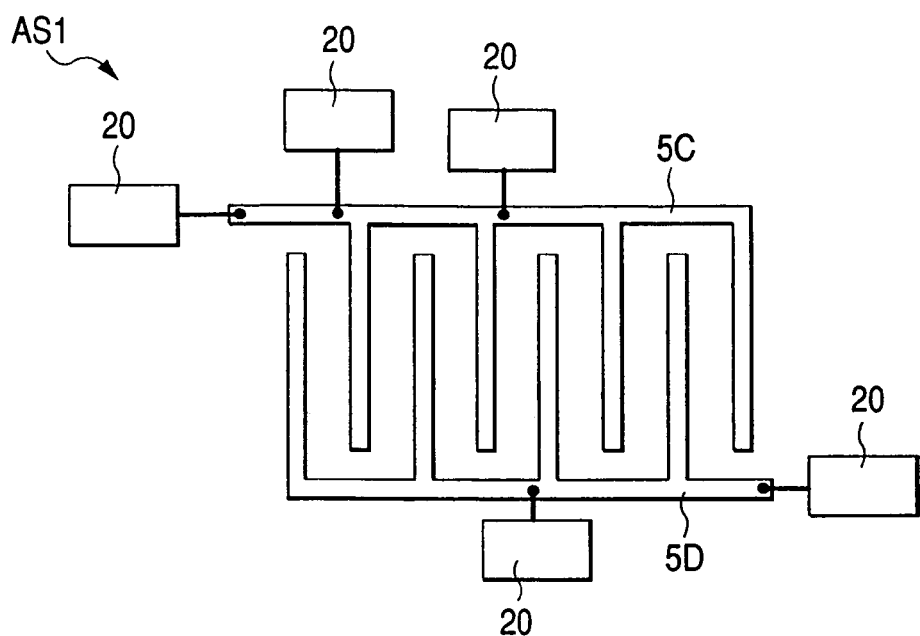
FIG. 20 is a diagram of a shield disposed on the semiconductor chip shown in FIG. 19.
Figure 21:
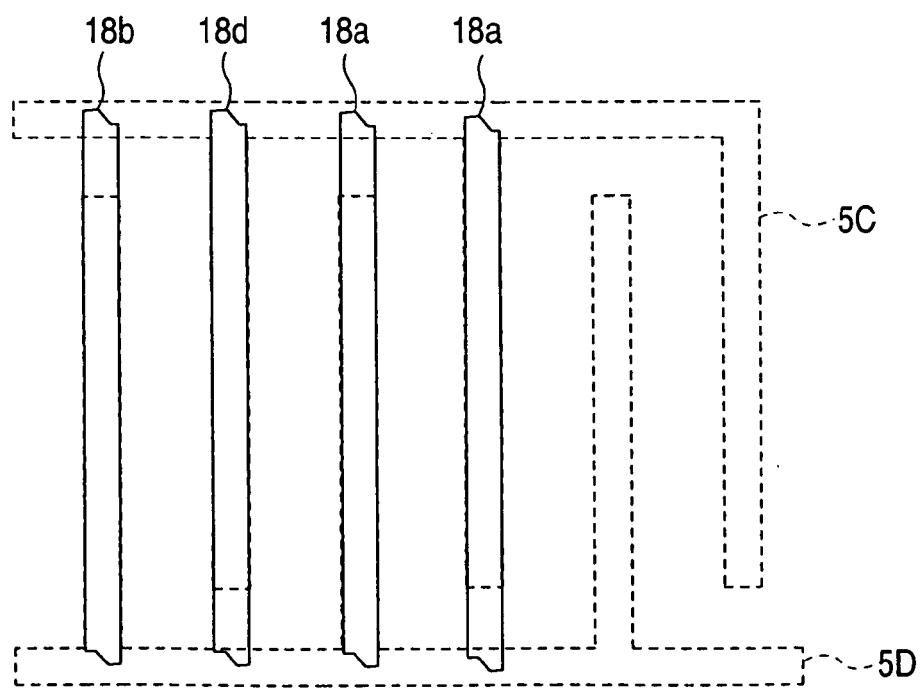
FIG. 21 is an enlarged plan view of a principal portion of FIG. 20.

FIG. 20 is an explanatory diagram showing an example of wiring lines 5C and 5D (the above-mentioned specific wiring lines, first wiring lines) for the active shield which constitute the active shield disposed in the area LA in FIG. 19. FIG. 21 is an enlarged plan view of a principal portion of FIG. 20.

FIGS. 20 and 21 show an example of an active shield having wiring lines 5C and 5D, which are comb teeth-like as seen in plan view. The wiring lines 5C and 5D overlie signal lines such as bus lines 18a, 18b and control signal lines 18c to 18e through an interlayer insulating film. The wiring lines 5C and 5D are arranged so as to cover the signal lines and so that the respective teeth are in engagement with each other. Further, the spacing between both wiring lines 5C and 5D is set as narrow as possible so that the underlying signal lines, including bus lines 18a, 18b and control signal lines 18c to 18e, cannot be observed (see FIG. 21). That is, the wiring lines 5C and 5D are formed over the underlying signal lines, such as bus lines 18a, 18b and control signal lines 18c to 18e, and are arranged in such a manner that the main extending direction of the wiring lines 5C and 5C is aligned with the main extending direction of the underlying signal lines. Therefore, even if an attempt is made to apply a needle to a signal line which underlies the wiring lines 5C and 5D with the intention of analyzing information stored in the chip 3, it cannot be done because these lines are obstructed by the wiring lines 5C and 5D. Accordingly, in such a structure as provided by this eighth embodiment, it is necessary to remove the wiring lines 5C and 5D to obtain access to the underlying lines. However, if even a portion of the wiring lines 5C and 5D is removed, the active shield system operates and the integrated circuit fails to operate, thus making the analysis of information impossible. That is, it is possible to improve the security of information stored in the IC card. In this eighth embodiment, moreover, the wiring lines 5C and 5D are arranged so that the underlying signal lines are invisible. Further, the wiring width and spacing of the wiring lines 5C and 5D are set at values (minimum processing size) equal to those of the underlying signal lines. By thus making the wiring lines 5C, 5D for the active shield and the underlying signal lines similar in size and position to each other, it is possible to make it easier to see which lines are true signal lines. In other words, it is possible to make the analysis of information stored in the IC card more difficult. For example, a supply voltage (GND, for example, 0V) on a low potential side is applied to the wiring line 5C and a supply voltage (VCC, 1.8V, 3.0V, 5.0V, for example) on a high potential side is applied to the wiring line 5D.

As shown in FIG. 20, plural processing detector circuits 20 may be electrically connected to each of the wiring lines 5C and 5D for the active shield. The processing detector circuits 20 may be connected to any positions (end part, middle position, position of the comb teeth) of the wiring lines 5C and 5D for the active shield. Further, one processing detector circuits 20 may be electrically connected to both of the two wiring lines 5C and 5D. It is preferable that the position where the processing detector circuits 20 are located, the connecting position where the wiring lines 5C and 5D for the active shield are connected to the processing detector circuits 20, and the number of the processing detector circuits 20 connected to each of the wiring lines 5C and 5D, will be irregular. Further, it is preferable that different distances be mixed between the processing detector circuits 20 and the wiring lines 5C, 5D for the active shield. As a result, it is possible to make decryption of the active shield system more difficult, and, hence, it is possible to make efforts at cancellation or causing failure of the active shield system to operate more difficult. Thus, the analysis of information stored in the IC card can be made more difficult, and, hence, it becomes possible to further improve the security of the IC card.

NINTH EMBODIMENT

In connection with this ninth embodiment, a description will be given of an example in which wiring lines for the supply voltage having a shielding function and wiring lines for the active shield are arranged at the same position planarly, but in different wiring layers sectionally.

Figure 22:
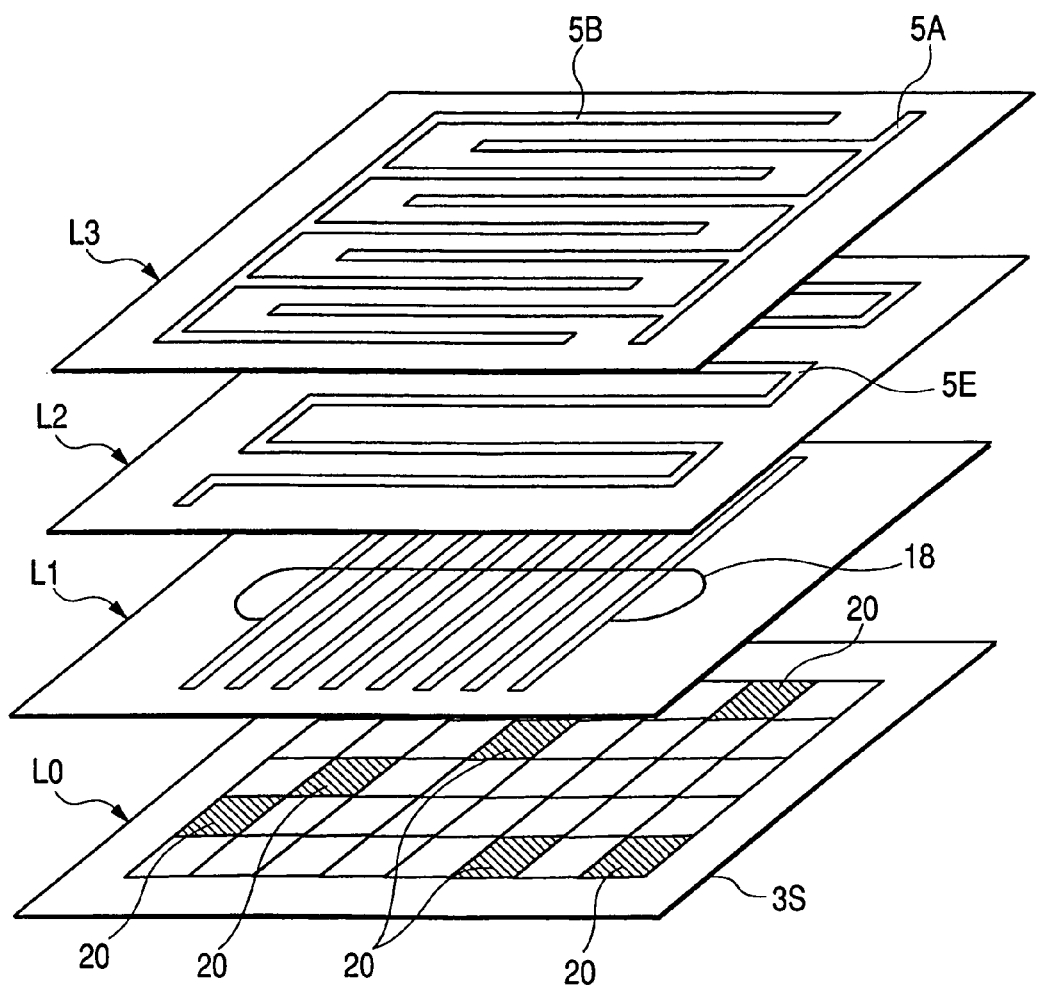
FIG. 22 is a developed perspective view of a layout layer structure of a semiconductor device according to a ninth embodiment of the present invention.
Figure 23:
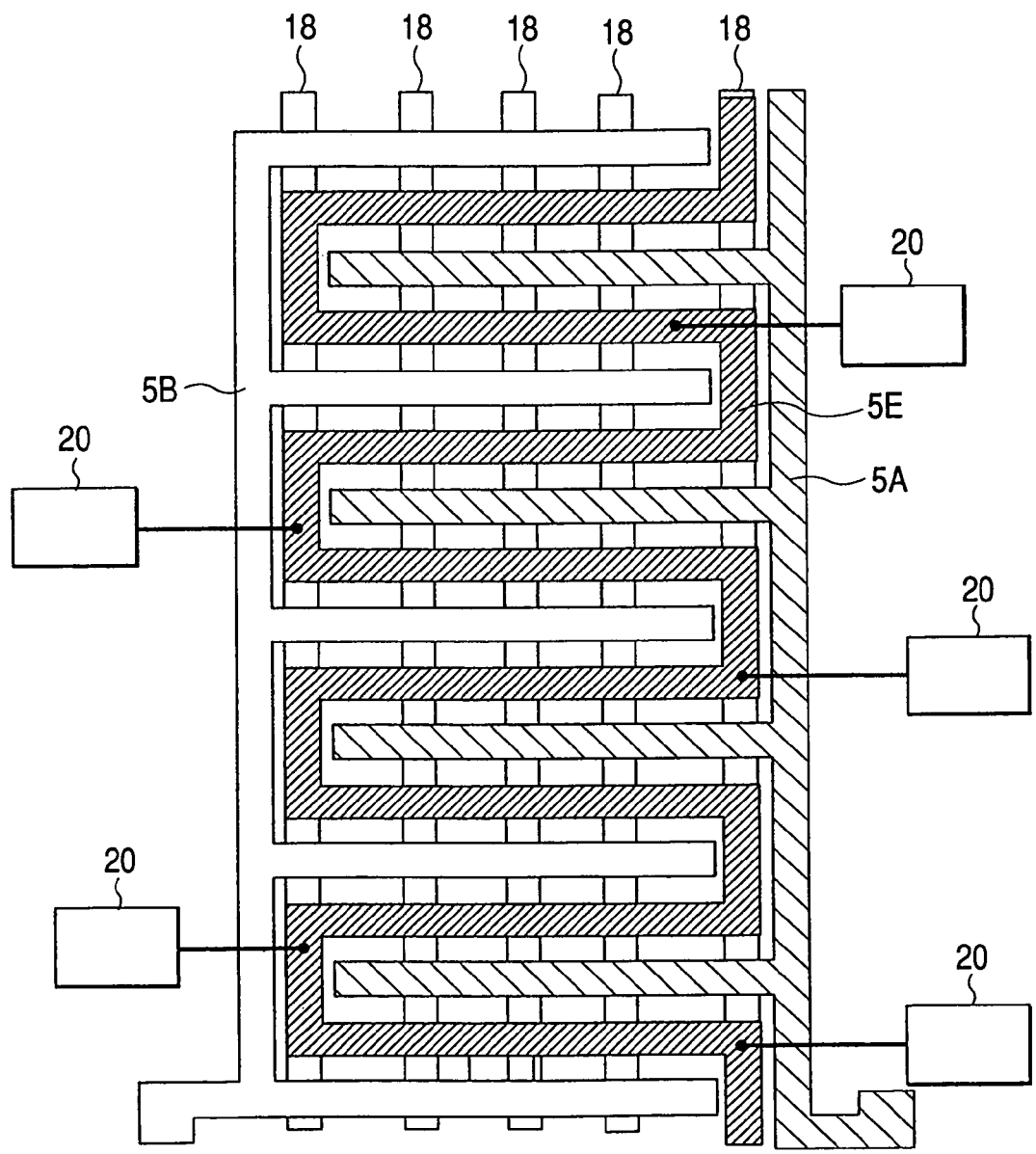
FIG. 23 is a plan view of a principal portion of FIG. 22.
Figure 24:
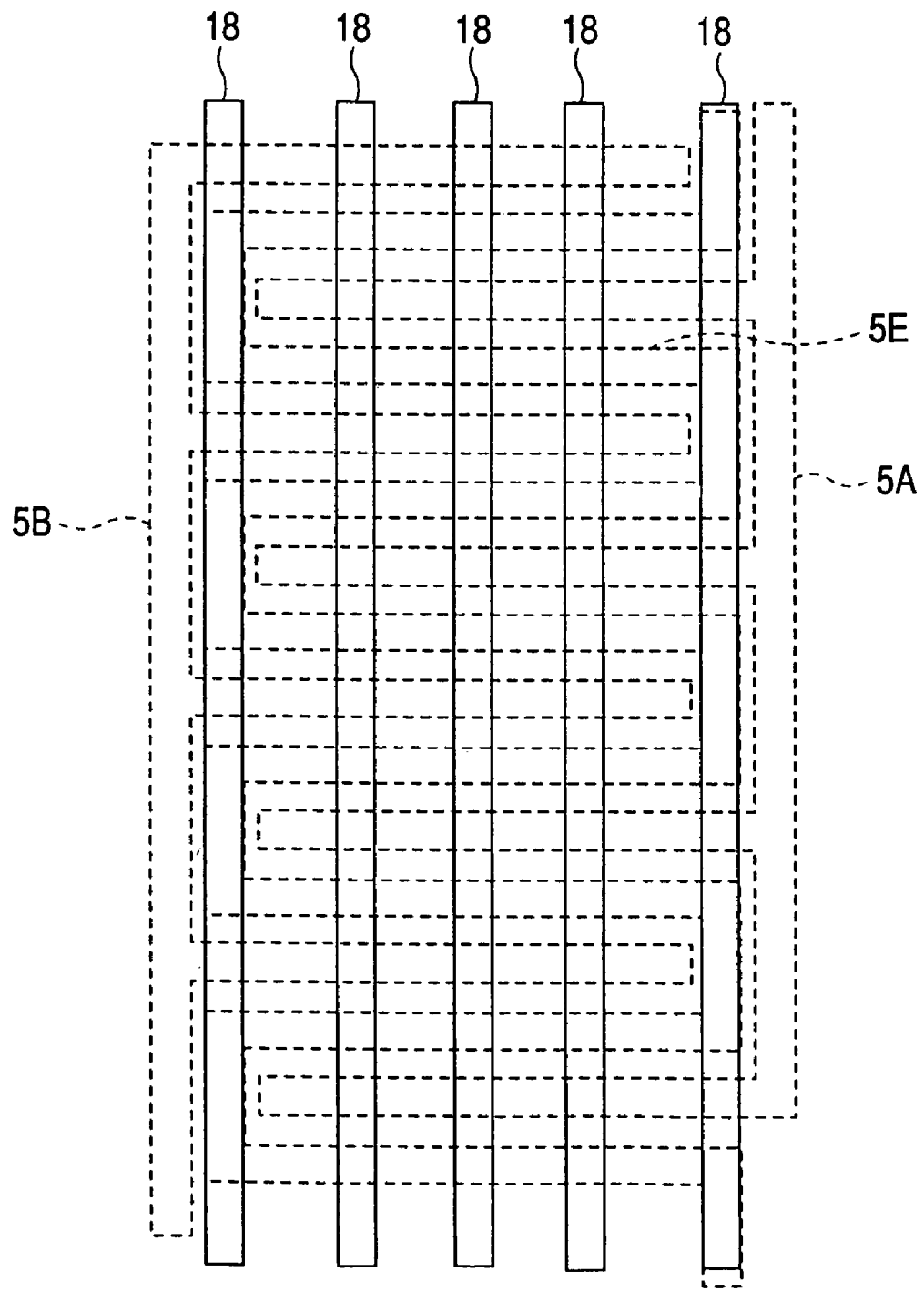
FIG. 24 is a plan view corresponding to FIG. 23, in which wiring lines having a shielding function are removed.

FIG. 22 is a diagram of a layout of the layer structure of a semiconductor device according to the ninth embodiment of the present invention, FIG. 23 is a plan view of a principal portion of FIG. 22, and FIG. 24 is a plan view of FIG. 23 with the shield removed. As shown in FIG. 22, in a bottom layout layer L0, plural integrated circuit regions are arranged, having desired elements which constitute, for example, cells, modules, as well as the foregoing memory circuit 3a, logic circuit group 3b and processing detector circuits. In a wiring layer L1 which overlies the layout layer L0 there are arranged signal lines 18, such as the foregoing bus lines 18a, 18b and control signal lines 18c to 18e. In a wiring layer L2 which overlies the wiring layer L1, there is disposed a wiring line (specific wiring line, first wiring line) 5E for an active shield, which has been described in conjunction with the sixth to eighth embodiments. In the illustrated example, there is shown a single meandering wiring line (one-stroke wiring line) serving as the wiring line 5E for the active shield. For example, a supply voltage (GND, for example, 0V) on the low potential side and a supply voltage (VCC, 1.8V, 3.0V, 5.0V, for example) on the high potential side, or a voltage other than those supply voltages, is applied to the wiring line 5E for the active shield. Plural processing detector circuits 20 are electrically connected to the wiring line 5E (see FIG. 23). The processing detector circuits 20 connected to the wiring line 5E are the same as those described in connection with the sixth to eighth embodiments, and, therefore, an explanation thereof will be omitted. Further, in a top wiring layer L3, which overlies the wiring layer L2, there are wiring lines 5A and 5B for the supply voltage having a shielding function, which have been described in conjunction with the first to fifth embodiments. Thus, in this ninth embodiment, the supply voltage wiring lines 5A, 5B having a shielding function and the wiring line 5E for the active shield are at the same planar position and in different wiring layers. By adopting such a multi-layer structure, wherein wiring lines having a shielding function are stacked in multiple layers at the same planar position and in different wiring layers through interlayer insulating films, or by arranging wiring lines having the same shielding function, but are different in technique, it is possible to make decryption of the shield system more difficult, and it is possible to make efforts at cancellation or causing failure of the shield system to operate more difficult, so that the analysis of information stored in the IC card can be made more difficult. Consequently, it becomes possible to further improve the security of the IC card. The relation in the vertical direction between the wiring layer 5A, 5B for the supply voltage and that of the wiring layer 5E for the active shield may be reversed. Between the wiring layer L3 with the supply voltage wiring lines 5A, 5B formed therein and the wiring layer L2 with the wiring line 5E for active shield formed therein, there may be interposed another wiring layer having a layout of supply voltage wiring lines possessing a shielding function and a wiring line for providing an active shield. Between the layout layer L0 and the wiring layer L1, between the wiring layers L1 and L2, and between the wiring layers L2 and L3, there is provided an interlayer insulating film, e.g., a silicon oxide film. That is, the wiring lines formed in each of the wiring layers L0, L1, L2, and L3 and the wiring lines formed in the adjacent upper and lower wiring layers are electrically isolated from each other by an interlayer insulating film, and those wiring lines are electrically interconnected through connecting holes formed in each interlayer insulating film.

In this ninth embodiment, as shown in FIG. 23, the wiring lines 5A, 5B for the supply voltage, which have a shielding function, and the wiring line 5E for the active shield are arranged at the same position (in the same wiring layer) as seen in plan view. Between adjacent wiring lines 5A and 5B for the supply voltage having a shielding function, there is disposed the underlying wiring line 5E for the active shield. Thus, by filling up the gap between adjacent supply voltage wiring lines 5A and 5B having a shielding function with the underlying wiring line 5E for the active shield, as shown in FIGS. 23 and 24, signal wiring lines 18, such as bus lines and control signal lines which underlie the wiring line 5E for the active shield, can be made more difficult to see, thereby making the application of a needle to the wiring lines 18 and the analysis of information with a FIB or the like more difficult. Consequently, it becomes possible to further improve the security of the IC card. As in the eighth embodiment, the wiring width and spacing of the wiring lines 5A, 5B, and 5E are set at the same values (minimum processing size) as those of the signal wiring lines 18, whereby the analysis of information stored in the IC card can be made more difficult, similar to the eighth embodiment.

TENTH EMBODIMENT

In this tenth embodiment, a description will be given of the case where a shield area is subdivided into plural areas and shields different in shape or technique are arranged respectively in the subdivided areas.

Figure 25:
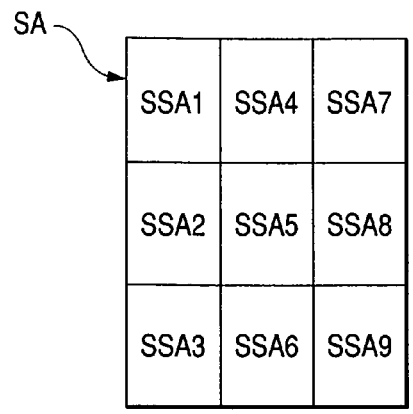
FIG. 25 is a diagram showing an example of subdivision of a shield area.

FIG. 25 shows a shield area SA for the arrangement of shields therein, and FIGS. 26 to 29 show plan views of examples of wiring lines for the active shield that are different in shape.

In this tenth embodiment, as shown in FIG. 25, the shield area (first area) SA is divided into nine sub-shield areas (second areas) SSA1 to SSA9, for example. In the illustrated example, the sub-shield areas LA1 to LA9 are the same in both shape and area. The shield area SA may be the whole of the main surface of the chip 3, or it may be only the wiring area (corresponding to the area LA) or circuit area on the main surface of the chip 3.

Figure 26:
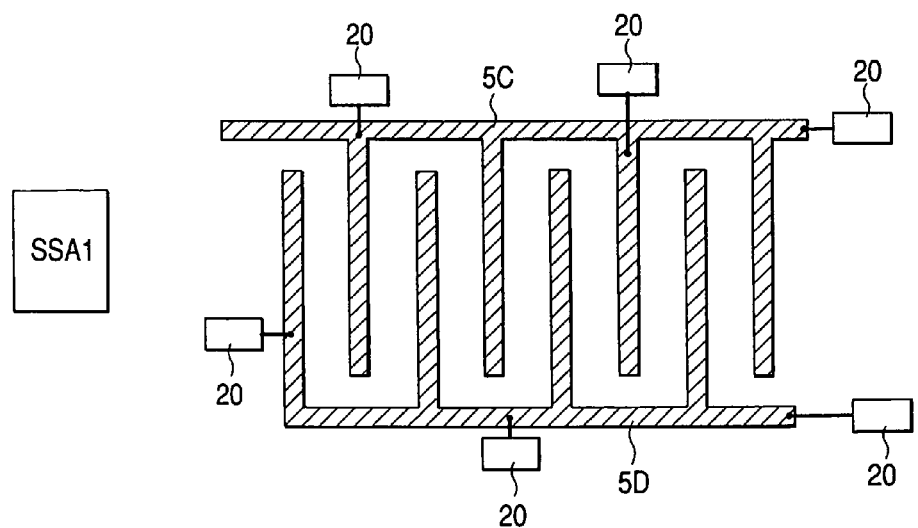
FIG. 26 is a plan view showing an example of wiring for an active shield.

FIG. 26 illustrates wiring lines 5C and 5D for the active shield, which are arranged in the sub-shield area SSA1. The wiring lines 5C and 5D for the active shield, as shown in FIG. 26, are comb teeth-shaped like that described previously in connection with FIG. 20.

Figure 27:
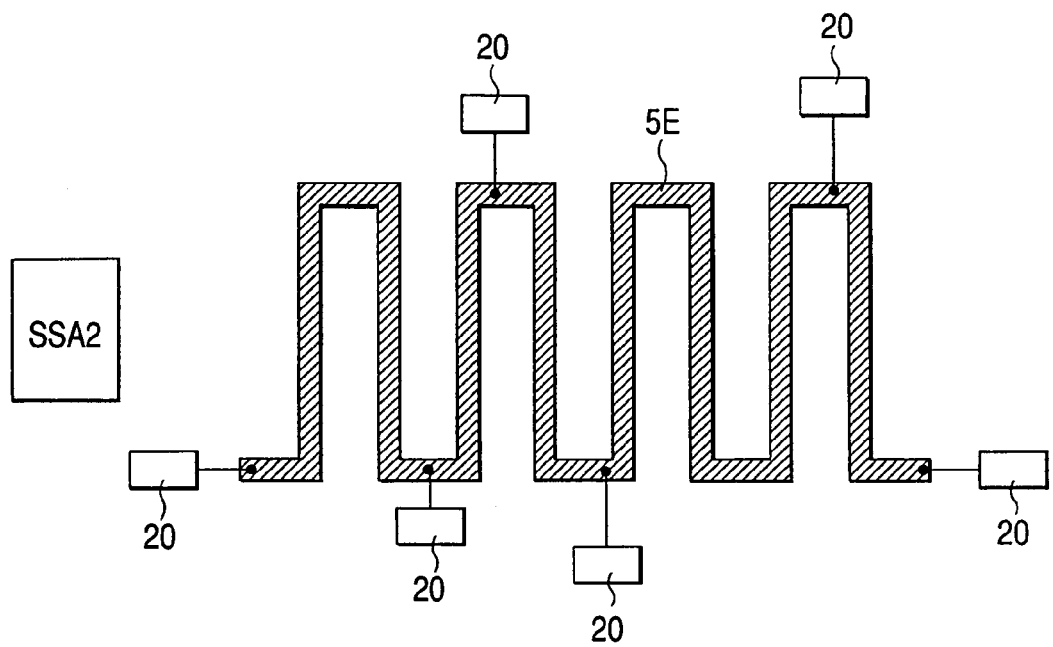
FIG. 27 is a plan view showing another example of wiring for an active shield.

FIG. 27 illustrates a wiring line 5E for the active shield, which is disposed in the sub-shield area SSA2. The wiring line 5E for the active shield, as shown in FIG. 27, has a meandering shape like that described previously in connection with FIGS. 22 and 23.

Figure 28:
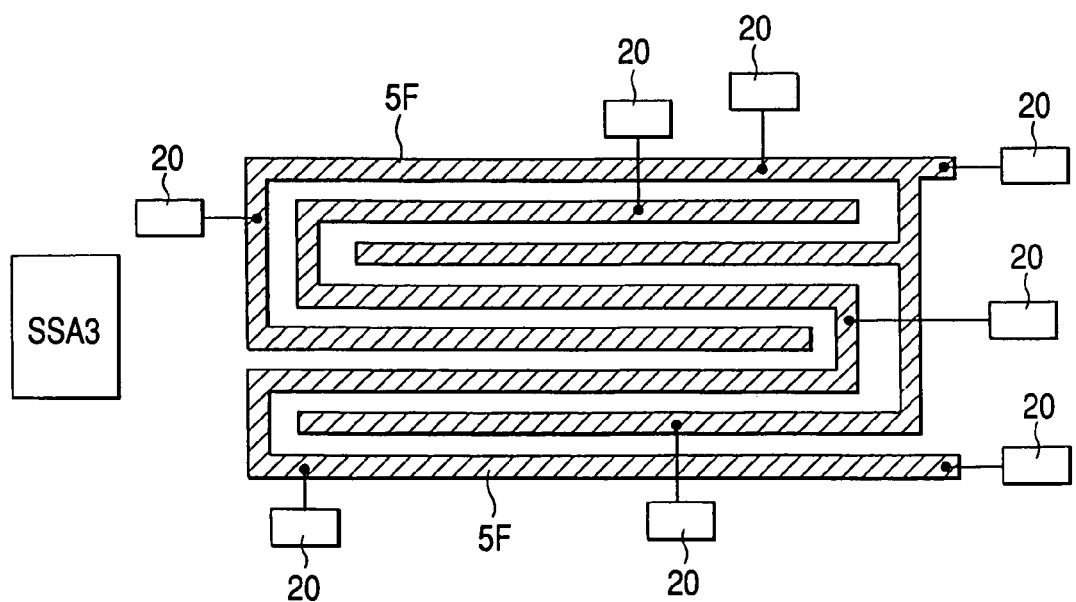
FIG. 28 is a plan view showing a further example of wiring for an active shield.

FIG. 28 illustrates a wiring line (specific wiring line, first wiring line) 5F for the active shield, which is disposed in the sub-shield area SSA3 shown in FIG. 25. The wiring line 5F, as shown in FIG. 28, has a complex intricate shape so that the meandering wiring line covers and hides the underlying signal lines and elements. For example, a supply voltage (GND, for example 0V) on the low potential side or a supply voltage (VCC, 1.8V, 3.0V, 5.0V,) on the high potential side is applied to the wiring line 5F.

Figure 29:
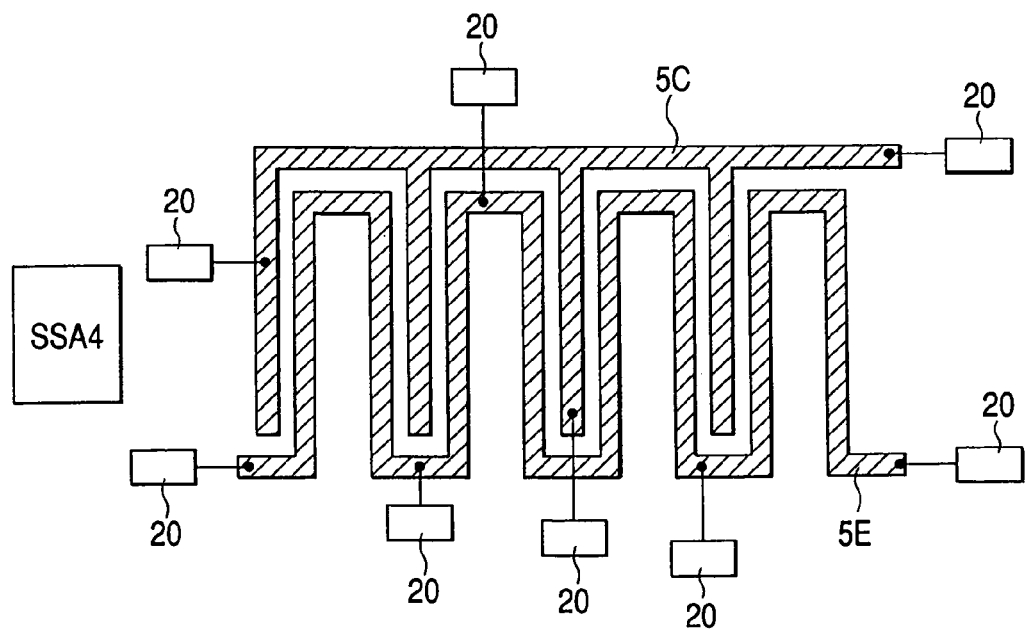
FIG. 29 is a plan view showing a still further example of wiring for an active shield.

FIG. 29 illustrates wiring lines 5C and 5E for the active shield, which are arranged in the sub-shield area SSA4 shown in FIG. 25. The wiring line 5C for the active shield, as shown in FIG. 29, has the same comb teeth-shape as that described earlier in connection with FIG. 20, while the wiring line 5E for the active shield, as shown in FIG. 29, has the same meandering shape as that described earlier in connection with FIGS. 22, 23 and 27. The wiring lines 5C and 5E are arranged in such a manner that the teeth of the wiring line 5C project into concave gaps of the wiring line 5E so as to cover and hide the underlying signal lines and elements. By thus arranging active shield wiring lines 5C, 5D, 5E, and 5F of various shape in the shield area SA, it is possible to make the decryption of the shield system difficult and to make efforts at cancellation and causing failure of the same system to operate also difficult, so that the analysis of information stored in the IC card can be made more difficult, and it becomes possible to further improve the security of the IC card. It is optional whether the wiring lines 5C, 5D, 5E, and 5F for the active shield are to be arranged in the same wiring layer or in different wiring layers. As in the eighth and ninth embodiments, the wiring width and spacing of the wiring lines 5C to 5F are set at values (minimum processing size) equal to those of the signal lines 18, whereby it is possible to make the analysis of information stored in the IC card difficult, as in the eighth and ninth embodiments. As to the construction of each processing detector circuit 20 and in what state the processing detector circuits 20 are arranged with respect to the wirings 5C to 5F, they are the same as in the sixth to ninth embodiments, and, therefore, an explanation thereof will be omitted.

The shape of the wirings for the active shield is not limited to the above-mentioned shape, but various changes may be made so long as the shape that is adopted can cover and hide the underlying signal lines and elements. It is not necessary that the wiring lines for the active shield arranged in the sub-shield areas SSA1 to SSA9 must all be made different in shape, but wiring lines for the active shield having the same shape also may be arranged in different sub-shield areas SSA1 to SSA9. Although reference has been made to only the active shield, the wiring lines 5A and 5B for the supply voltage and having a shielding function, as described in connection with the first to fifth embodiments, may be arranged in different shapes for each of the sub-shield areas SSA1 to SSA9. An arrangement also may be adopted wherein the wiring lines 5A and 5B for the supply voltage and having a shielding function are arranged in any of the sub-shield areas SSA1 to SSA9 and the wiring lines for the active shield are arranged in the other sub-shield areas. In this way, it is possible to make decryption of the shield system more difficult, and it is also possible to make efforts at cancellation and causing failure of the shield system to operate difficult, so that the analysis of information stored in the IC card can be made more difficult, and it becomes possible to further improve the security of the IC card.

Figure 30:
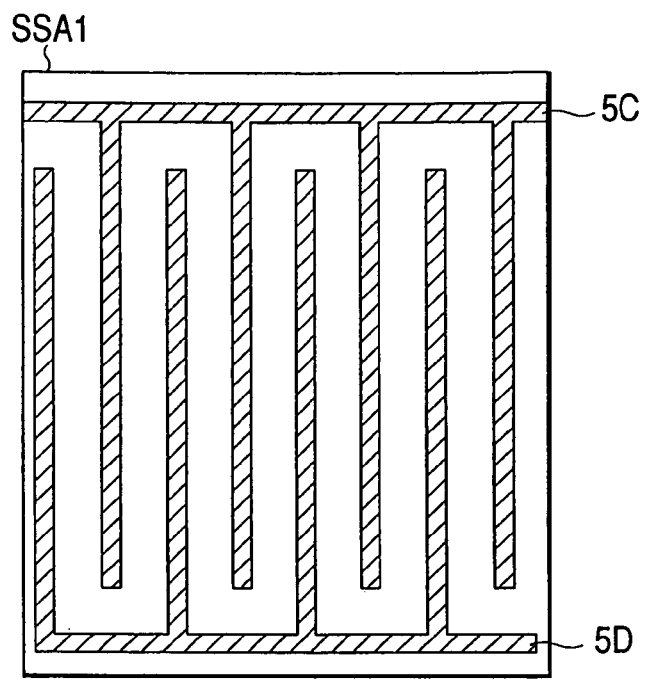
FIG. 30 is a plan view showing an example of the wiring layout for an active shield in each of the subdivided areas of the shield area.
Figure 31:
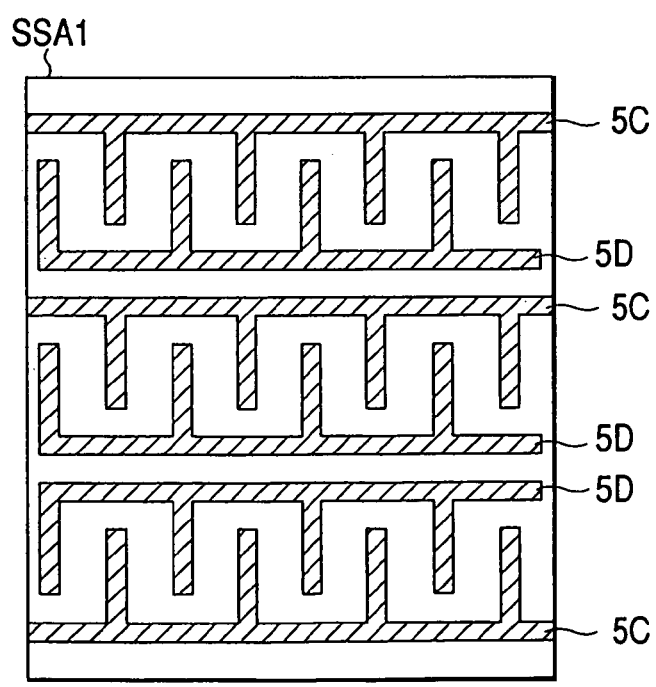
FIG. 31 is a plan view showing another example of the wiring layout for an active shield in each of subdivided areas of the shield area.

FIGS. 30 and 31 show examples of the layout of wiring lines for the active shield arranged in the sub-shield areas SSA1 to SSA9, of which FIG. 30 shows a case where one pair of wiring lines 5C and 5D for the active shield are arranged in the sub-shield area SSA1, and FIG. 31 shows a case where plural pairs of wiring lines 5C and 5D for the active shield are arranged in the sub-shield area SSA1. In FIG. 1, vertically asymmetrically arranged pairs and vertically symmetrically arranged pairs are mixed together. According to this arrangement, it is possible to make decryption of the shield system difficult, and it is also possible to make efforts at cancellation and causing failure of the shield system to operate difficult, so that the analysis of information stored in the IC card can be made more difficult, and, hence, it is possible to further improve the security of the IC card.

In each of the first to ninth embodiments, by arranging a shield of a different shape or technique for each of such subdivided areas, as provided in this embodiment, it is possible to make the analysis of information in the IC card more difficult, and, therefore, the security of the IC card can be further improved.

ELEVENTH EMBODIMENT

In connection with this eleventh embodiment, a description will be given of a case where the planar positional relation between wiring lines for the active shield and the detector circuits connected electrically thereto is irregular.

Figure 32:
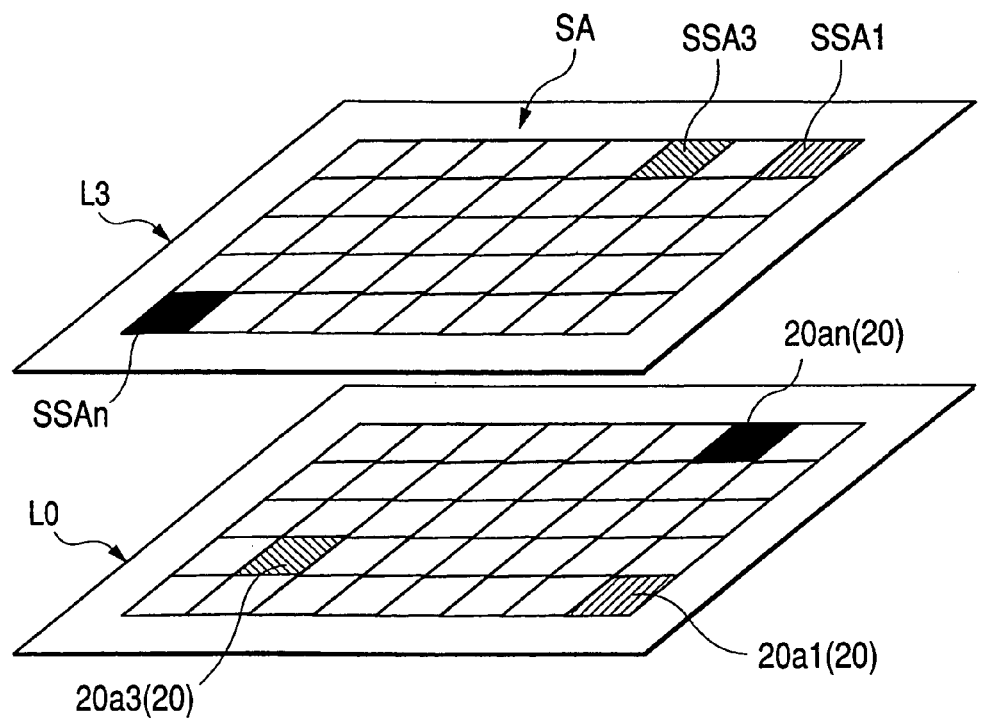
FIG. 32 is a diagram showing an example of the layout of wiring lines and detectors, both constituting a shield system, in a semiconductor device according to an eleventh embodiment of the present invention.

It does not matter where the processing detector circuits which constitute the active shield system are to be connected to the wiring lines for the active shield. However, if the relation of the connection between the processing detector circuits and the wiring lines for the active shield is decrypted and the position of the processing detector circuits becomes clear, there is a fear that the processing detector circuits may be destroyed to prevent them from carrying out the shielding function. In this eleventh embodiment, in view of such an inconvenience, the wiring lines for the active shield and the processing detector circuits connected electrically thereto are arranged so as to be irregular in planar positional relation. FIG. 32 shows an example of such a layout. In this figure, three sub-shield areas SSA1, SSA3, SSAn, are shown, and three processing detector circuits 20a1, 20a3, 20an (20) corresponding thereto, respectively, are provided. Corresponding sub-shield areas and processing detector circuits are hatched so as to clarify the relation of the correspondence therebetween. The processing detector circuit 20a1, which is connected to a predetermined active shield wiring line, that is disposed in the sub-shield area SSA1 in a top wiring layer L3, is disposed in a layout layer L0 at a position that is not just under the sub-shield area SSA1, but is at a different irregular planar position. Also, as to the other sub-shield areas SSA3 and SSAn in the wiring layer L3, the processing detector circuits 20a3 and 20an, which are connected to the active shield wiring lines in those sub-shield areas, are arranged in the layout layer L0 without regularity relative to the arranged positions of the sub-shield areas SSA3 and SSAn. Consequently, it is possible to make decryption difficult with respect to the positional and connectional relations between the wiring lines for the active shield in the sub-shield areas SSA1, SSA3, SSAn and the processing detector circuits 20 (20a1, 20a3, 20an), and it is also possible to make attempts at cancellation and causing failure of the shield system to operate more difficult, so that the analysis of information stored in the IC card can be made more difficult, and it is possible to further improve the security of the IC card.

By applying to each of the sixth to tenth embodiments a layout in which the planar positional relation between the wiring lines for the active shield and the detector circuits connected electrically thereto, as provided in this embodiment, it is possible to make the analysis of information stored in the IC card more difficult, and the security of the IC card can be further improved.

TWELFTH EMBODIMENT

Figure 33:
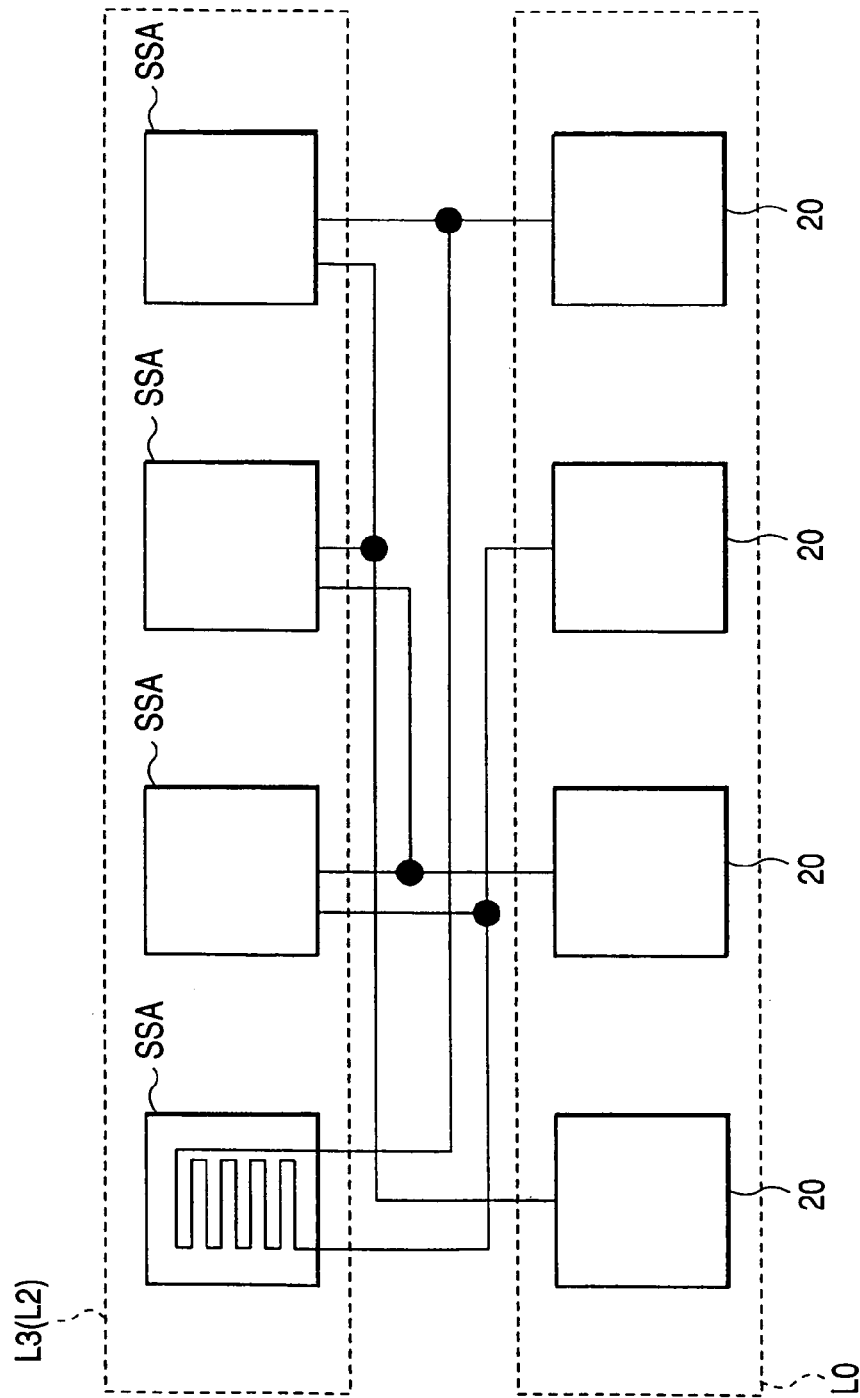
FIG. 33 is a block diagram which illustrates an example of a shield system in a semiconductor device according to a twelfth embodiment of the present invention.

In this twelfth embodiment reference will be made to an example in which plural processing detector circuits are electrically connected to a predetermined active shield wiring line. FIG. 33 shows an example of an active shield system according to this embodiment, in which plural sub-shield areas SSA are arranged. The sub-shield areas SSA correspond to the foregoing sub-shield areas SSA1 to SSA9. In each sub-shield active area SSA there is disposed a wiring line for the active shield. The active shield wiring lines in the sub-shield areas SSA may be the same or different. Plural processing detector circuits 20 are connected electrically to the active shield wiring line in each sub-shield area SSA. The active shield wiring lines and the processing detector circuits 20 are connected together randomly in a wiring layer disposed intermediate between a wiring layer including a layout layer L0 and the foregoing principal signal lines and a wiring layer wherein the wiring lines for the active shield are arranged. The connectional relation between the wiring lines for the active shield and the processing detector circuits 20 is made so complicated as to make the decryption thereof difficult. The area of each sub-shield area SSA is kept to a minimum, and each active shield wiring line is monitored by plural processing detector circuits 20. In this way, even if one processing detector circuit 20 is destroyed and invalidated, the information stored in the IC can be protected, because another processing detector circuit 20 will operate. By subdividing the shield area SA into sub-shield areas SSA of a small area, an entire shield wiring layout in the shield area SA and the connectional relation thereof to the processing detector circuits 20 can be made more complicated, so that it is possible to make decryption of the shield system difficult, and it is possible to improve the IC card security.

By applying to each of the sixth to eleventh embodiments a layout such as provided in this embodiment, wherein plural processing detector circuits are connected electrically to a predetermined wiring line for the active shield, the analysis of information stored in the IC card can be made more difficult, and it is possible to further improve the security of the IC card.

THIRTEENTH EMBODIMENT

In connection with this thirteenth embodiment, reference will be made is to a case where the potential of a wiring line for the active shield is not made constant, but is varied with the lapse of time.

Figure 34:
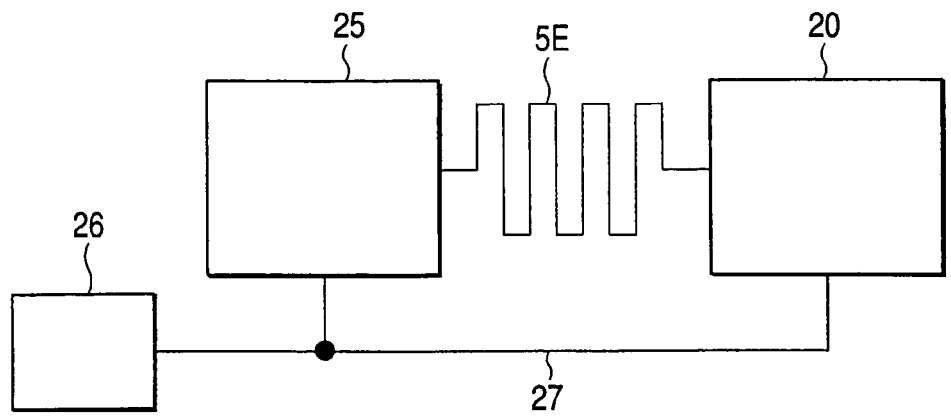
FIG. 34 is a block diagram which illustrates a configuration example of a shield system in a semiconductor device according to a thirteenth embodiment of the present invention.

FIG. 34 is a diagram showing an example of an active shield system according to the thirteenth embodiment of the present invention. In this system, a predetermined potential is supplied from a potential supply circuit 25 formed in the chip 3 to a wiring line (5E in FIG. 34) for the active shield. The potential supply circuit 25 changes the potential that is fed to the wiring line 5E in synchronism with a synchronizing signal provided from an independent oscillator 26 formed within the chip 3. The synchronizing signal from the oscillator 26 is also applied to a processing detector circuit 20 through a synchronizing signal line 27 so that, also on the processing detector circuit 20 side, a proper-or-not reference potential is changed to match the synchronizing signal fed from the oscillator 26. The proper-or-not reference potential is a reference potential serving as a reference of comparison when judging whether the potential of the active shield wiring line 5E, which is detected by the processing detector circuit 20, is proper or not. If the proper-or-not reference potential is equal to the detected potential, (including an allowable error), the detected potential is judged to be proper. More specifically, in the processing detector circuit 20, the potential of the active shield wiring line 5E, which is detected at a predetermined time, is compared with the proper-or-not reference potential detected at the predetermined time, and upon detection of a difference between both potentials, the processing detector circuit 20 resets the integrated circuit in the chip 3 so as to make the integrated circuit unable to operate, thereby preventing the analysis of information stored in the IC card. Thus, since efforts at cancellation and causing failure of the active shield system to operate can be made difficult by changing the potential of the active shield wiring line 5E, it is possible to make the analysis of information stored in the IC card more difficult, and the security of the IC card can be further improved. The oscillator 26 is adapted to operate upon turning ON of the power supply.

By applying to each of the sixth to twelfth embodiments, the construction of this embodiment, wherein the potential of the active shield wiring line is not made constant, it is possible to make the analysis of information stored in the IC card more difficult, and the security of the IC card can be further improved.

FOURTEENTH EMBODIMENT

In connection with this fourteenth embodiment, reference will be made to another example in which the potential of a wiring line for the active shield is not constant, but is varied with the lapse of time.

Figure 35:
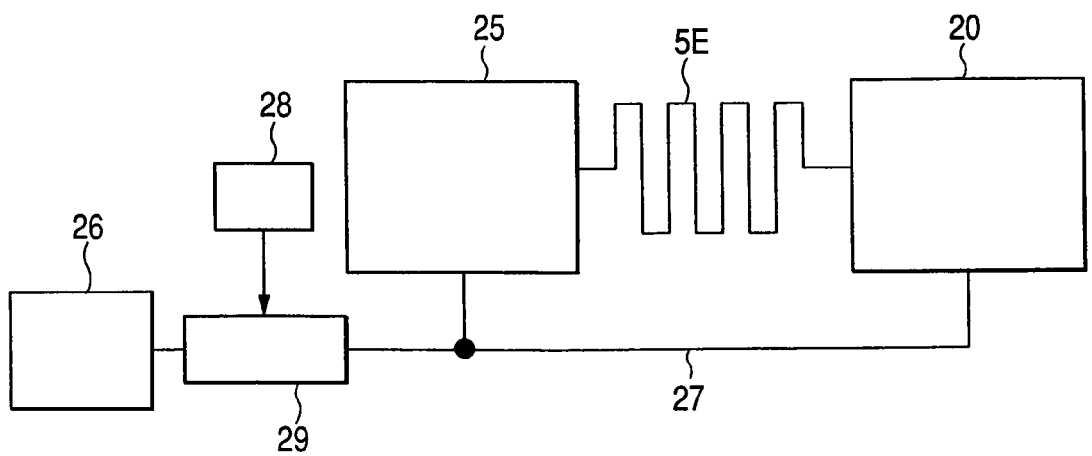
FIG. 35 is a block diagram which illustrates an example of a shield system in a semiconductor device according to a fourteenth embodiment of the present invention.

In connection with this fourteenth embodiment, the potential switching time for an active shield wiring line is irregular. FIG. 35 is a diagram showing an example of an active shield system according to this fourteenth embodiment. In this system, a frequency divider circuit 29 is turned ON or OFF in response to a signal provided from a random number generator circuit 28, thereby changing the frequency of a synchronizing signal that is outputted from the oscillator 26. In this fourteenth embodiment, the frequency of the synchronizing signal outputted from the oscillator 26 is changed irregularly through the frequency divider circuit 26. In synchronism with the synchronizing signal provided from the frequency divider circuit 29, a potential supply circuit 25 changes the potential fed to a wiring line (5E in FIG. 35) for the active shield. Therefore, in this fourteenth embodiment, the potential of the active shield wiring line 5E does not change periodically, but changes at irregular times. Further, the synchronizing signal provided from the frequency divider circuit 29 is applied also to the processing detector circuit 20 through a synchronizing signal line 27. In accordance with the synchronizing signal provided from the frequency divider circuit 29, the processing detector circuit 20 changes the proper-or-not reference signal described in the previous thirteenth embodiment. Thus, in this fourteenth embodiment, even if the potential of the active shield wiring line 5E varies irregularly, it is possible to change the proper-or-not reference potential of the processing detector circuit 20 accordingly. The processing detector circuit 20 compares the potential of the active shield wiring line 5E that is detected at a predetermined time with the proper-or-not reference potential to be detected at the predetermined time; and, upon detection of a difference between both potentials, the processing detector circuit 20 resets the integrated circuit in the chip 3 so as to render the integrated circuit unable to operate, as in the thirteenth embodiment, thereby preventing the analysis of information stored in the IC card. By thus making the timing of the potential change of the wiring line 5E for active shield irregular, the timing can be made difficult to read. Further, it is possible to make any effort to effect cancellation and to cause failure of the active shield system to operate more difficult, and the analysis of information stored in the IC card can be made more difficult, so that it becomes possible to further improve the security of the IC card. The active shield system in this fourteenth embodiment and that in the previous thirteenth embodiment may be mixed together in the same chip 3, whereby it becomes more difficult to decrypt the active shield systems in the chip 3, and, therefore, it becomes possible to further improve the security of the IC card.

By applying to each of the sixth to thirteenth embodiments the construction of this embodiment, wherein the potential of the active shield wiring line is not kept constant, but is varied with the lapse of time, it is possible to make the analysis of information stored in the IC card more difficult, and the security of the IC card can be further improved.

FIFTEENTH EMBODIMENT

In connection with this fifteenth embodiment, reference will be made to another example in which the potential of a wiring line for active shield is not made constant, but is varied with the lapse of time.

Figure 36:
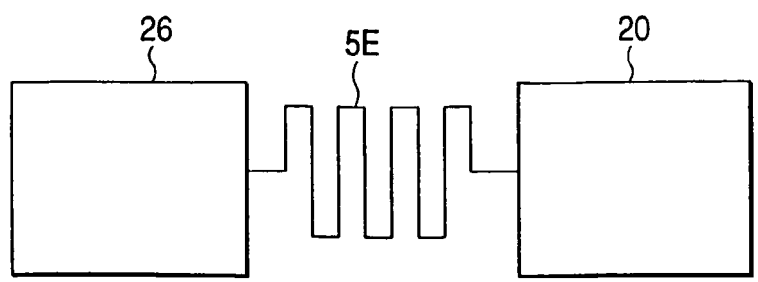
FIG. 36 is a block diagram which illustrates an example of a shield system in a semiconductor device according to a fifteenth embodiment of the present invention.

In this fifteenth embodiment, a signal having a predetermined frequency is allowed to flow in a wiring line of the active shield, and when the signal of that frequency can not be detected, control is effected to make the integrated circuit in the chip 3 unable to operate. FIG. 36 shows an example of an active shield system for a semiconductor device according to the fifteenth embodiment of the present invention.

A signal of a predetermined frequency generated by an oscillator 26 is transmitted to a wiring line (5E in FIG. 36) for the active shield. While the signal of the predetermined frequency is flowing in the wiring line 5E for the active shield, the processing detector circuit 20 does not operate at all, but when the potential of the active shield wiring line 5E is fixed to high or low levels direct-currentwise, the processing detector circuit 20 detects it and resets the integrated circuit in the chip 3, thereby disabling the integrated circuit so as to prevent the analysis of information stored in the IC card.

According to this fifteenth embodiment, the following effects can be obtained in addition to the effects obtained in the thirteenth and fourteenth embodiments. Since the construction of the shield system is simple and it is difficult to destroy, it is possible to make an effort to effect cancellation and to cause failure of the active shield system to operate more difficult, and, hence, it is possible to make the analysis of information stored in the IC card more difficult, whereby it becomes possible to further improve the security of the IC card. Besides, since the construction of the shield system is simple, the semiconductor device manufacturing process does not become complicated. Moreover, it is possible to decrease the layout area of elements and wiring lines for the active shield system in comparison with the thirteenth and fourteenth embodiments. Further, the active shield system in this fifteenth embodiment and the active shield system in the thirteenth and fourteenth embodiments may be mixed together in the same chip 3, whereby the decryption of the shield system in the chip 3 becomes more difficult, and, thereby, it is possible to further improve the security of the IC card.

By applying to each of the sixth to fourteenth embodiments the construction of this embodiment, wherein the potential of the wiring line for the active shield is not made constant, but is varied with the lapse of time, whereby the analysis of information in the IC card can be made more difficult, and it is possible to further improve the security of the IC card.

SIXTEENTH EMBODIMENT

Figure 37:
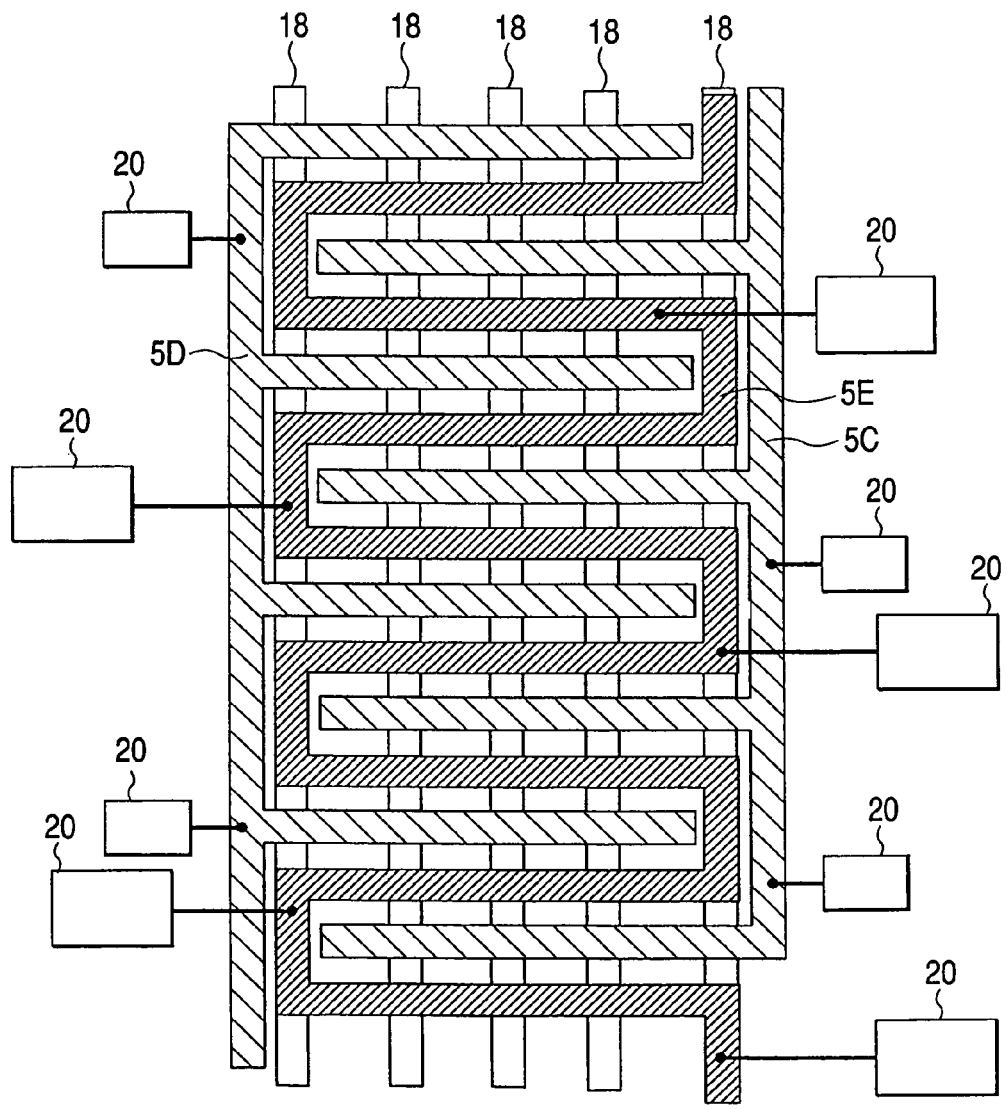
FIG. 37 is a plan view showing an example of wiring for shielding in a semiconductor device according to a sixteenth embodiment of the present invention.

In connection with this sixteenth embodiment, reference will be made to an example in which different active shield wiring lines are arranged in the same wiring layer. FIG. 37 shows an example of the layout of wiring lines 5C, 5D, and 5E for the active shield according to this sixteenth embodiment. In this sixteenth embodiment, active shield wiring lines 5C, 5D, and 5E having different shapes are arranged in the same wiring layer in the chip 3. The shapes of the wiring lines 5C, 5D, and 5E are the same as in the eighth to tenth embodiments. The layout of the wiring lines 5C and 5D is the same as in the eighth and tenth embodiments. The wiring line 5E is disposed in a gap between adjacent wiring lines 5C and 5D so as to cover and hide underlying signal lines 18 and other elements. As in the eighth to tenth embodiments, plural processing detector circuits 20 are electrically connected to each of the wiring lines 5C, 5D, and 5E. Also, in this sixteenth embodiment, it is possible to improve the security of the IC card.

By applying to each of the sixth to fifteenth embodiments the construction of this sixteenth embodiment, wherein different active shield wiring lines are arranged in the same wiring layer, it is possible to make the analysis of information stored in the IC card more difficult, and, therefore, the security of the IC card can be further improved.

SEVENTEENTH EMBODIMENT

Figure 38:
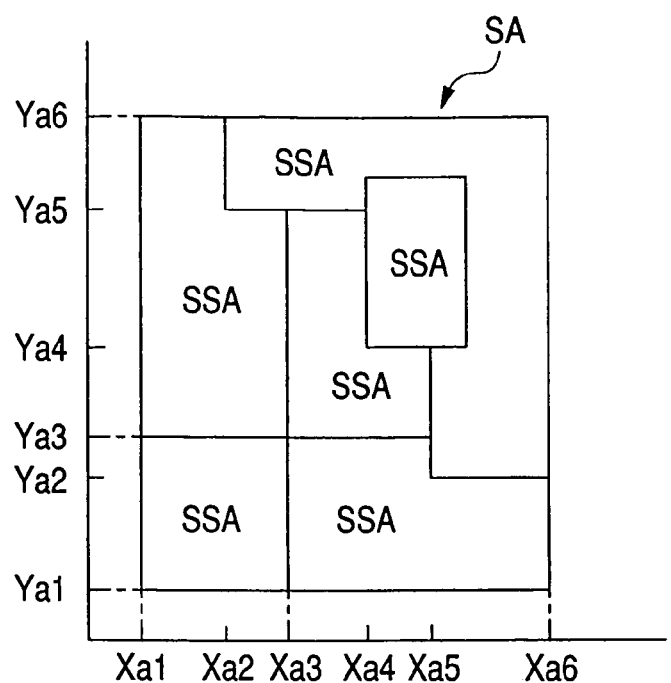
FIG. 38 is a diagram showing an example of subdivision of a shield area.

In connection with this seventeenth embodiment, reference will be made to another example in which a shield area is subdivided into plural sub-shield areas. FIG. 38 is a plan view showing an example of a shield area SA, in which Xa1, Xa2, . . . Xa6 represent X coordinates and Ya1, Ya2, . . . Ya6 represent Y coordinates.

Also, in this seventeenth embodiment, the shield area SA is subdivided into plural sub-shield areas SSA, provided the sub-shield areas SSA are mutually different in area and the various shapes thereof are arranged irregularly. Thus, the layout of the sub-shield areas SSA in the shield area SA are asymmetric vertically and transversely. As in the tenth embodiment, wiring lines for the active shield that are different in shape are arranged in each sub-shield area SSA, whereby it is possible to make decryption of the active shield system difficult, and, hence, it is possible to improve the security of the IC card.

By applying to each of the sixth to sixteenth embodiments the construction of this embodiment, wherein the shield area is subdivided into plural sub-shield areas, it is possible to make decryption of information stored in the IC card more difficult, and the security of the IC card can be further improved.

EIGHTEENTH EMBODIMENT

In connection with this eighteenth embodiment, reference will be made to a further example in which a shield area is subdivided into plural sub-shield areas.

Figure 39:
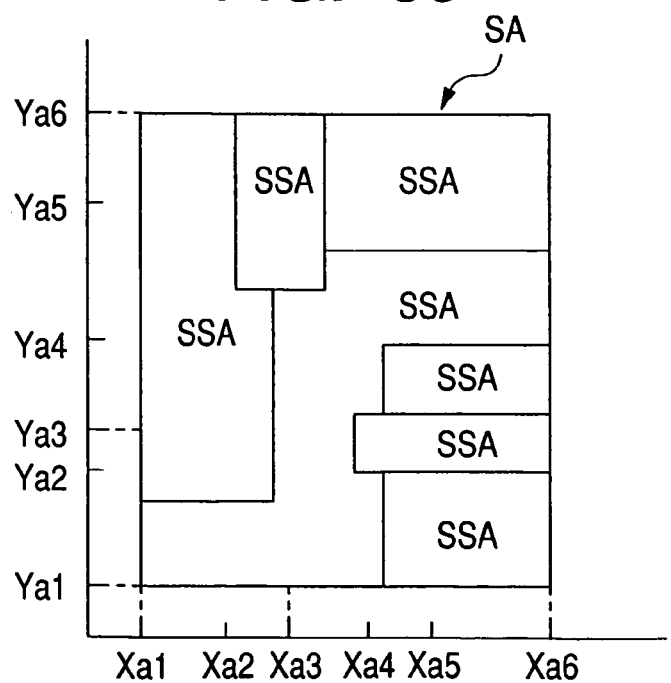
FIG. 39 is a diagram showing another example of subdivision of a shield area.

In this eighteenth embodiment, the subdividing of the shield area is changed for each chip which constitutes an IC card or for each production of a semiconductor device. FIG. 39 is a plan view showing an example of a shield area SA. In FIG. 39, like FIG. 38, the shield area SA is subdivided into plural sub-shield areas SSA, which sub-shield areas, however, are different in shape and layout from those shown in FIG. 38. In this eighteen embodiment, even in the same wafer, the shield area SA shown in FIG. 38 is used for certain chips and the shield area SA shown in FIG. 39 is used for other chips. Alternatively, the shield area SA shown in FIG. 38 is used for all of the chips in a certain wafer, and the shield area SA shown in FIG. 39 is used for all of the chips in another wafer. In this way, even if the shield system in one chip is decrypted, this does not directly lead to the possibility of decrypting the shield system in another chip. Consequently, it is possible to make decryption of an active shield system difficult, and, hence, it is possible to improve the security of the IC card.

By applying to each of the sixth to seventeenth embodiments the construction of this embodiment, wherein the shield area is subdivided into plural sub-shield areas, it is possible to make the analysis of information stored in the IC card more difficult, and, further, to improve the security of the IC card.

NINETEENTH EMBODIMENT

In connection with this nineteenth embodiment, reference will be made to an example in which different shield areas are stacked in multiple layers. More specifically, the active shield wiring lines in the shield areas shown in FIGS. 38 and 39 are arranged at the same planar position on the chip 3 and in different wiring layers, whereby, when seen in plan view, the superposition of the active shield wiring lines can be made more complicated, and, therefore, it is possible to make decryption of the active shield system difficult. Consequently, it becomes possible to improve the security of the IC card.

The active shield wiring lines in different wiring layers may be connected together electrically via through holes or the like. The through holes are fine holes formed through an interlayer insulating film which is interposed between different wiring layers, and a connecting conductor is embedded in the interior of each through hole. In this case, by changing the layout position of the through holes for each chip, the wiring route of the active shield system can be changed by a relatively simple method in both design and process. More particularly, even when the active shield wiring lines in different chips may appear equal in planar layout at first glance, there is an entirely different wiring route of the active shield system in different chips due to a difference in the layout of the through holes. Besides, the through holes are so fine that, by a mere glance at the through holes as seen in plan view, it is difficult to search for the wiring route, and, therefore, it is possible to make decryption of the active shield system difficult, thus permitting improvement in the security of the IC card.

By applying to each of the sixth to eighteenth embodiments the construction of this embodiment, wherein different shield areas are stacked in multiple layers, it is possible to make the analysis of information stored in the IC card more difficult, and the security of the IC card can be further improved.

Although the present invention has been described above specifically on the basis of various embodiments thereof, it goes without saying that the present invention is not limited to those embodiments, but that various changes may be made within a scope not departing from the gist of the invention.

For example, although the sixth and seventh embodiments have been described with reference to a case where, if a wiring line for detecting a processing using a processing detector circuit is cut off, the cutting is detected, the invention is not limited thereto. There may be adopted, for example, a construction wherein, even when the wiring line for detecting a processing is not cut off completely, but is cut partially and is connected partially, a change in potential is detected by utilizing the phenomenon that the potential of the processing detecting wiring line is varied by the processing, thereby resetting the integrated circuit.

Although the first to seventh embodiments have been described with reference to a case where the present invention is applied to a so-called contact type IC card, wherein the reading and writing of information for the chip are carried out through electrodes formed on the back side of the package substrate, the invention is not limited thereto, but is applicable to various other types of IC cards. For example, the present invention is also applicable to a so-called non-contact type IC card, wherein a coil (antenna) is provided within a card body and the reading and writing of data are carried out by utilizing radio waves in a non-contact manner using a reader/writer.

Moreover, by combining each of the first to nineteenth embodiments with one or more of the other embodiments included in the first to nineteenth embodiments, it is possible to make the decryption of information stored in the IC card more difficult, and the security of the IC card can be further improved.

It goes without saying that the wiring structures of the first to nineteenth embodiments are not limited to the illustrated ones, but there may be a metallic multi-layer wiring structure comprising five to ten layers.

Although the present invention has been described above mainly with reference to its application to an IC card as a background application field of the invention, the invention is not limited thereto, but is applicable, for example, to all products having a semiconductor device which stores information.

In short, according to the constructions of the above embodiments, wiring lines 5A and 5B for the supply of a voltage to feed a drive voltage to the integrated circuit in the semiconductor chip 3 are arranged so as to cover the main surface of the semiconductor chip 3, and if the wiring lines 5A and 5B are removed for the purpose of analyzing information stored in the semiconductor chip 3, the integrated circuit fails to operate, making it impossible to analyze the information. Thus, if predetermined wiring lines arranged in an upper layer of the semiconductor chip are removed or cut off, it becomes impossible to analyze information stored in the chip, whereby it is possible to improve the security of information stored in the semiconductor chip.

Further, processing detector circuits 20 for detecting a processing of the wiring lines 5A and 5B are provided, which, upon detection of a processing of the wiring lines 5A and 5B, operate to reset the integrated circuit. With such processing detector circuits, it is impossible to analyze information stored in the semiconductor chip, and, therefore, the security of information stored in the semiconductor device can be improved.

The present invention is useful as a semiconductor device for use as a medium for the storage of various items of information in various fields, including electronic money, credit card, portable telephone, chargeable satellite broadcast receiver, identification card, license, insurance policy, electronic medical sheet, electronic railway ticket, finance, distribution, medical care, traffic, transportation, and education, and it is particularly suitable in its application to an IC card.

What is claimed is:

1. A semiconductor device comprising:
(a) a first area disposed over a semiconductor substrate;
first semiconductor elements disposed in the first area, formed in the semiconductor substrate and configured to store information;
second semiconductor elements disposed in the first area and formed in the semiconductor substrate;
a signal line disposed in the first area and formed over the first and second semiconductor elements;
(b) one or more first wiring lines formed over the signal line and disposed in the first area; and (c) second wiring lines formed over the signal line and disposed in the first area, the second wiring lines being formed in a layer different from a layer in which the first wiring lines are formed,
wherein the first and second wiring lines are wiring lines for supply voltage, respectively,
wherein each of the first wiring lines is connected to a detector circuit, which is configured to be used for detection of tampering with the first wiring lines and which is comprised of the second semiconductor elements,
wherein, when any of the first wiring lines are subjected to processing, the detector circuit operates to make the first semiconductor elements unable to operate, and
wherein the first wiring lines are located in a lower wiring layer, closer to the substrate, than the second wiring lines.

2. The semiconductor device according to claim 1,
wherein, when any part of the second wiring lines are removed, the first semiconductor elements are rendered unable to operate.

3. The semiconductor device according to claim 1,
wherein, in the plan view, the first wiring lines are disposed in a gap between each of the second wiring line.

4. The semiconductor device according to claim 1,
wherein the first wiring lines are configured to be connected to a high potential supply voltage line and a low potential supply voltage line.

5. The semiconductor device according to claim 1,
wherein the second wiring lines are configured to a high potential supply voltage line and a low potential supply voltage line.

6. The semiconductor device according to claim 1,
wherein at least one of the first wiring lines has a plurality of the detector circuits.

7. The semiconductor device according to claim 1, wherein the first and second semiconductor elements are MISFETs, respectively.

8. A semiconductor device comprising:
a first area disposed over a semiconductor substrate;
first semiconductor elements disposed in the first area, formed in the semiconductor substrate and configured to store information;
second semiconductor elements disposed in the first area and formed in the semiconductor substrate;
a signal line disposed in the first area and formed over the first and second semiconductor elements;
one or more first wiring lines formed over the signal line and disposed in the first area; and
second wiring lines formed over the signal line and disposed in the first area, the second wiring lines being formed in a layer different from a layer in which the first wiring lines are formed,
wherein the first and second wiring lines are wiring lines for supply voltage, respectively,
wherein each of the first wiring lines has a detector circuit, which is configured to be used for detection of tampering with the first wiring lines and which is comprised of the second semiconductor elements,
wherein, when any part of the first wiring lines are subjected to processing, the detector circuit operates to make the first semiconductor elements unable to operate, wherein, when a part of the second wiring lines are removed, the first semiconductor elements are rendered unable to operate, wherein the first wiring lines are located in a lower wiring layer, closer to the substrate, than the second wiring lines.

9. The semiconductor device according to claim 8, wherein, in the plan view, the first wiring lines are disposed in a gap between each of second wiring lines.

10. The semiconductor device according to claim 8, wherein the first wiring lines are configured to be connected to a high potential supply voltage line and a low potential supply voltage line.

11. The semiconductor device according to claim 8, wherein the second wiring lines are configured to be connected to a high potential supply voltage line and a low potential supply voltage line.

12. The semiconductor device according to claim 8, wherein at least one of the first wiring lines has a plurality of the detector circuits.

13. The semiconductor device according to claim 8, wherein the first and second semiconductor elements are MISFETs, respectively.

14. The semiconductor device according to claim 1, wherein the first and second wiring lines are configured to have a shielding effect.

15. The semiconductor device according to claim 8, wherein the first and second wiring lines are configured to have a shielding effect.

16. The semiconductor device according to claim 1, wherein the second wiring lines are disposed in a top wiring layer over the substrate.

17. The semiconductor device according to claim 8, wherein the second wiring lines are disposed in a top wiring layer over the substrate.

18. The semiconductor device according to claim 1, wherein said processing of the first wiring lines includes partial or complete cuffing.

19. The semiconductor device according to claim 8, wherein said processing of the first wiring lines includes partial or complete cutting.

20. The semiconductor device according to claim 1, wherein when any of the second wiring lines is subjected to processing, the detector circuit operates to make the first semiconductor elements unable to operate.

21. The semiconductor device according to claim 8, wherein when any of the second wiring lines is subjected to processing, the detector circuit operates to make the first semiconductor elements unable to operate.

22. The semiconductor device according to claim 21, wherein said processing of the first wiring lines includes partial or complete cutting.

23. The semiconductor device according to claim 22, wherein said processing of the first wiring lines includes partial or complete cutting.

24. The semiconductor device according to claim 6, wherein the detector circuits are arranged in an irregularly dispersed fashion in the first area to make destruction of all of the detector circuits difficult.

25. The semiconductor device according to claim 12, wherein the detector circuits are arranged in an irregularly dispersed fashion in the first area to make destruction of all of the detector circuits difficult.

* * * * *